US011210609B2

(12) United States Patent
Ali et al.

(10) Patent No.: US 11,210,609 B2
(45) Date of Patent: Dec. 28, 2021

(54) USER VEHICLE OPERATION INTERFACE SYSTEMS AND METHODS

(71) Applicant: Traxen Inc., Plymouth, MI (US)

(72) Inventors: Syed Ali, Plymouth, MI (US); Ali Maleki, Plymouth, MI (US); Gerti Tuzi, Plymouth, MI (US); Nabil Hk Hirzallah, Plymouth, MI (US); Saeed Zamanzad Gavidel, Plymouth, MI (US)

(73) Assignee: Traxen Inc., Plymouth, MI (US)

( * ) Notice: Subject to any disclaimer, the term of this patent is extended or adjusted under 35 U.S.C. 154(b) by 171 days.

(21) Appl. No.: 16/438,305

(22) Filed: Jun. 11, 2019

(65) Prior Publication Data

US 2019/0378040 A1     Dec. 12, 2019

Related U.S. Application Data

(63) Continuation of application No. 16/355,657, filed on Mar. 15, 2019, and a continuation of application No.
(Continued)

(51) Int. Cl.
*G06N 20/00*     (2019.01)
*B60W 50/00*     (2006.01)
(Continued)

(52) U.S. Cl.
CPC ............. *G06N 20/00* (2019.01); *B60W 30/14* (2013.01); *B60W 50/0097* (2013.01); *B60W 2050/0013* (2013.01); *B60W 2400/00* (2013.01)

(58) Field of Classification Search
USPC ......................................................... 701/98
See application file for complete search history.

(56) References Cited

U.S. PATENT DOCUMENTS

| 9,020,726 | B2 | 4/2015 | Boeckenhoff et al. |
| 2016/0016525 | A1* | 1/2016 | Chauncey ............ G07C 5/0808 |
| | | | 701/123 |

(Continued)

FOREIGN PATENT DOCUMENTS

DE     102016214045     2/2018

*Primary Examiner* — Tyler D Paige

(57) ABSTRACT

Presented systems and methods facilitate efficient and effective performance of vehicle operations. In one embodiment, a system comprises a user interface, a processor, and a memory. The user interface is configured to convey information associated with operation of a vehicle to and from a user, wherein the information associated with the operation of the vehicle includes information associated with a performance objective. Information associated with the operation of the vehicle can include metric information that expresses a characteristic corresponding to the performance objective. The metric information can be associated with various aspects (e.g., current, future, etc.) of the vehicle operation. Processing by the processor can include comparative analysis of actual performance of the vehicle operation to target values associated with the vehicle operation. The user interface can include a performance indicator. The performance indicator can be configured to convey information associated with the various aspects of vehicle operation.

20 Claims, 25 Drawing Sheets

Related U.S. Application Data

16/355,641, filed on Mar. 15, 2019, now Pat. No. 11,072,329, and a continuation of application No. 16/289,638, filed on Feb. 28, 2019, now abandoned, and a continuation of application No. 16/289,635, filed on Feb. 28, 2019, now abandoned, and a continuation of application No. 16/212,108, filed on Dec. 6, 2018.

(60) Provisional application No. 62/683,188, filed on Jun. 11, 2018.

(51) Int. Cl.
  *B60W 30/14* (2006.01)
  *G06N 7/00* (2006.01)

(56) References Cited

U.S. PATENT DOCUMENTS

| | | | | |
|---|---|---|---|---|
| 2018/0008855 | A1* | 1/2018 | Yanev | A63B 24/0062 |
| 2018/0047107 | A1* | 2/2018 | Perl | G06Q 20/10 |
| 2018/0072157 | A1 | 3/2018 | Koebler et al. | |
| 2018/0075380 | A1* | 3/2018 | Perl | G06Q 50/30 |
| 2018/0345777 | A1* | 12/2018 | Birnschein | B60K 31/0008 |
| 2019/0378041 | A1* | 12/2019 | Dhansri | G06N 20/00 |

* cited by examiner

2400

2410 Receiving input information associated with ground vehicle operation.

2420 Processing the input information, including a evaluating performance of the ground vehicle operation.

2430 Generating output information based upon evaluation of the ground vehicle operation, including output information associated with performance of the ground vehicle operation.

2440 Creating interface information configured to convey results of the evaluation.

2450 Presenting the interface information, including presenting information indicating metrics corresponding to performance of the ground vehicle operation.

FIG 24

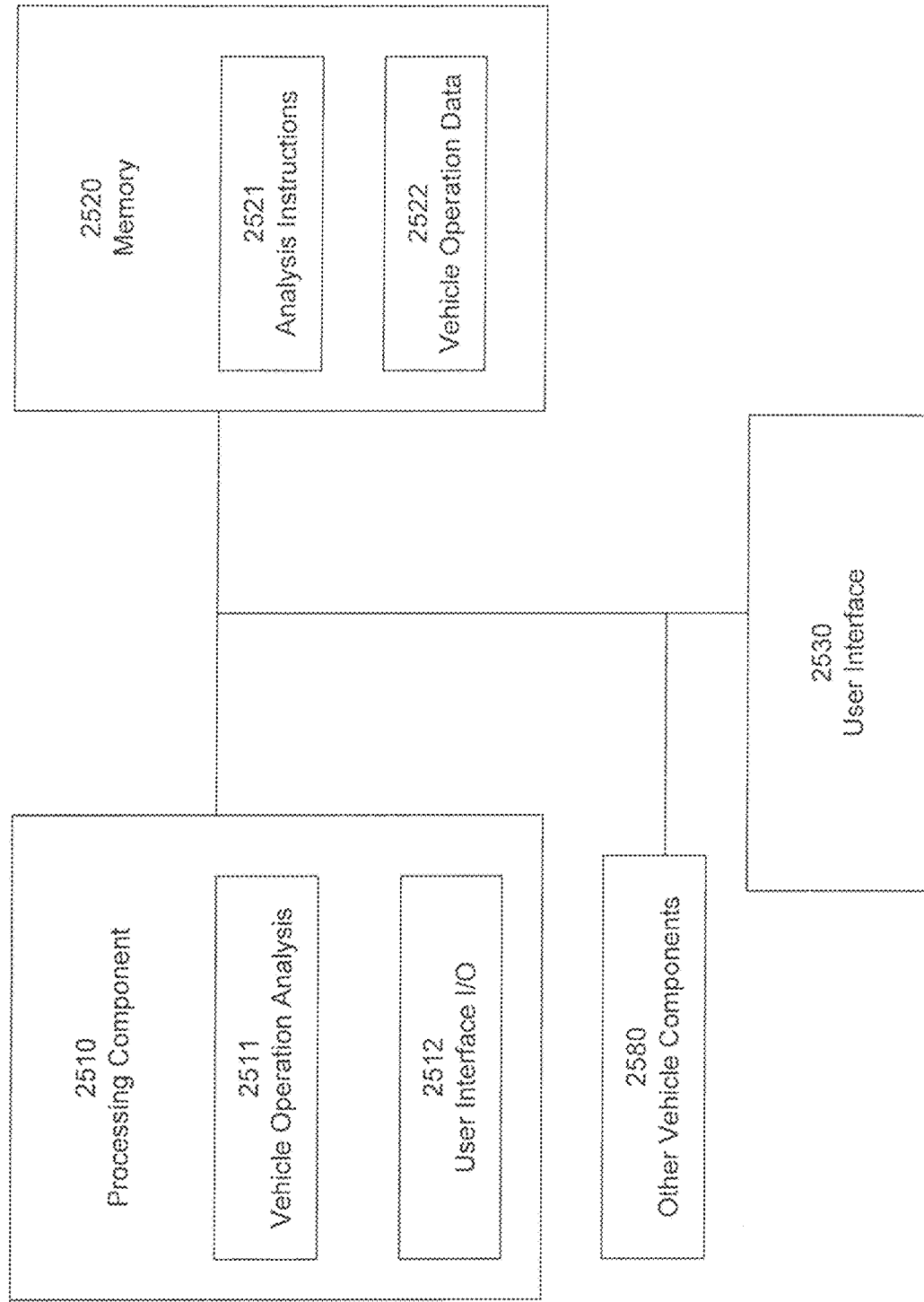

USER VEHICLE OPERATION INTERFACE SYSTEMS AND METHODS

RELATED APPLICATIONS

This is a Continuation of U.S. patent application Ser. No. 16/355,657, filed Mar. 15, 2019, a Continuation of U.S. patent application Ser. No. 16/355,641, filed Mar. 15, 2019, a Continuation of U.S. patent application Ser. No. 16/289,638 filed Feb. 28, 2019, a Continuation of U.S. patent application Ser. No. 16/289,635, filed Feb. 28, 2019, a Continuation of U.S. patent application Ser. No. 16/212,108 filed Dec. 6, 2018, and claims the benefit of U.S. Provisional Patent Application No. 62/683,188 filed Jun. 11, 2018, all of which are incorporated herein by reference in their entirety. This application also claims the benefit of co-filed U.S. application Ser. No. 16/438,319, filed Jun. 11, 2019, entitled "Predictive Control Techniques for Ground Vehicles", co-filed U.S. application Ser. No. 16/438,337, filed Jun. 11, 2019, entitled "Pre-Training of a Reinforcement Learning Ground Vehicle Controller using Monte Carlo Simulation", co-filed U.S. application Ser. No. 16/438,223, filed Jun. 11, 2019, entitled "Normalized Performance Comparison Techniques", and co-filed PCT Application No. PCT/US19/36634, filed Jun. 11, 2019, entitled "Automated Cruise Control System to Automatically Decrease an Overall Ground Vehicle Energy Consumption", all of which are incorporated herein by reference in their entirety.

FIELD OF THE INVENTION

Embodiments of the present invention relate to the field of systems and methods that facilitate efficient and effective vehicle operations.

BACKGROUND

Vehicles are an important part of modern society and often used to make numerous endeavors more convenient. Traditionally, various types of vehicles participate in numerous different activities, such as transportation, construction, agriculture, and so on. The costs associated with operating such vehicles can be significant and it is appreciated there are a number of different types of costs that can contribute to the overall operational cost (e.g., energy or fuel costs, maintenance costs, labor/operator costs, insurance, etc.). Typically, the manner in which vehicle operations are implemented (e.g., speed, acceleration/deceleration rates, turning radius, etc.) can have a very significant impact on the operating costs. Implementation of acceleration/deceleration rates and turning radiuses can greatly increase energy consumption and maintenance issues (e.g., wear and tear on breaking systems, tires, shock absorbers, engines, etc.). The way a vehicle is operated can also have significant impacts on secondary costs (e.g., damage to things being carried by the vehicle, damage to roadways, etc.).

Conventional vehicle operation typically involves a feedback loop in which a user is responsible for most or all of the significant control decisions and operations. The user is often responsible for detecting or sensing various conditions (e.g., observing objects, listening for sirens, feeling bumpy pathways, etc.), analyzing the conditions and determining appropriate adjustments (e.g., accelerate/decelerate, turn, etc.), and conveying the adjustments to the vehicle (e.g., step on the pedal an appropriate amount, rotate a steering wheel an appropriate amount, etc.). Traditional users, being subject to human frailties, are also often considered the "weakest link" in conventional vehicle operation feedback loops. Users typically do not have a skill level sufficient to accurately detect operating conditions and control implementation of vehicle operations in a manner that realizes desirable or optimized performance. There is also a great deal of difference in skill level between different users, with the vast majority usually falling far short of being considered optimal or desirable users.

In addition, vehicles are typically utilized in environments that present a great deal of variable and dynamic operating conditions. Differing environmental conditions (e.g., terrain, weather, etc.), numerous path configurations (e.g., straight, curves, winding, etc.), varying traffic conditions (e.g., number of other vehicles, frequency of stop lights/signs, etc.), and the like often require vehicle operation adjustments (e.g., adjust speeds, acceleration/deceleration, gears, etc.) in order to maintain a high performance level. The traditional impediments to users accurately performing traditional feedback loop responsibilities can have significant adverse impacts of vehicle operation performance and corresponding operational costs.

Overcoming vehicle operation performance issues was typically problematic in the past. Conventional attempts at fully autonomous vehicle operation and complete removal of user participation are usually cost prohibit and often impractical. Traditional attempts at maintaining user participation while providing support for vehicle operations are often very limited. For example, traditional status indication aids (speedometers, tachometers, etc.) are typically limited to just presenting an indication of an actual present condition. In some instances, traditional status indications may attempt to provide some warning of a dangerous condition (e.g., overheating, parking break still on, etc.), but do not typically provide a suggestion on implementing vehicle operation. In addition, traditional approaches to assisting with vehicle operation are also typically limited to somewhat simplistic solutions (e.g., static control, setting a cruise control to a specific speed, etc.) that do not address the typical complex conditions (e.g., dynamic conditions, changing traffic speeds, etc.) encountered during vehicle operations. Past vehicle operation approaches do not typically provide a mechanism for realizing sufficiently desirable improved vehicle operation performance. In addition, traditional interaction and interfacing between a user and vehicle are typically limited and do not provide vehicle operation related information in a sufficient amount or suitable manner to facilitate improved vehicle operation and realization of performance objectives.

SUMMARY

Presented systems and methods facilitate efficient and effective performance of vehicle operations. In one embodiment, a system comprises a user interface, a processor, and a memory. The user interface is configured to convey information associated with operation of a vehicle to and from a user, wherein the information associated with the operation of the vehicle includes information associated with a performance objective. The processor is configured to process information associated with the operation of the vehicle; wherein the processor communicates with the user interface. The memory is configured to store information associated with the operation of the vehicle, including information associated with the user interface. Information associated with the operation of the vehicle can include metric information that expresses a characteristic corresponding to the performance objective. The metric information can be associated with various aspects (e.g., current, future, etc.) of the vehicle operation. Processing by the processor can include comparative analysis of actual performance of the vehicle operation to target values associated with the vehicle operation. The user interface can include performance indicators. The performance indicator can be configured to convey information associated with the various aspects of vehicle operation.

It is appreciated there are numerous different performance objectives (e.g., fuel efficiency, travel time, reducing wear and tear, safe/unsafe driving maneuvers, etc.). The performance objective can be based upon operation of a vehicle similar to the vehicle by another user. The performance objective can be based upon historical operation of the vehicle the use. The performance objective can be based on a model that was previously learned based on observed data. The performance objective can be associated with a cost of operating the vehicle. The performance objective can be directed to various metrics (e.g., fuel efficiency, travel time, reducing wear and tear, unsafe swerving/tailgating/stopping, etc.). In one embodiment, selection of which performance metric information is conveyed via a user interface can be made by a user, an analysis component, both, and so on.

In one embodiment, a method includes receiving input information associated with vehicle operation, processing the input information, generating output information based upon evaluation of the vehicle operation, creating interface information configured to convey results of the evaluation, and presenting the interface information. Processing of the input information can include evaluating performance of the vehicle operation. Generating output information can include output information associated with performance of the vehicle operation. Presenting the interface information can include presenting information indicating metrics corresponding to performance of the vehicle operation. In one embodiment, the interface information includes guidance on implementation of an operational characteristic of the vehicle with respect to realizing a performance objective. The interface information can include guidance on current implementation of the vehicle operation. The output information can include guidance on future implementation of vehicle operation. In one exemplary implementation, creating interface information and presenting interface information can be based upon an operating mode of the vehicle. The operating mode can correspond to the nature of user participation in operation of a vehicle. The operating mode can be selected from one of a group or set. The group or set can include a passive mode, a coaching mode, an assist mode, and an autonomous mode.

In one embodiment, a system comprises an analysis component configured to analyze input information associated vehicle operation, including analysis associated with a performance target, wherein the analysis component generates output information based upon results of analyzing the input information, and a user interface component configured to convey the output information to a user, including output information associated with the performance target. The user interface component can also be configured to detect input information associated with the vehicle operation and forward the input information to the analysis component. The input information can be conveyed from the user to the analysis component via the user interface. In one exemplary implementation, features of the user interface are dependent upon a driving mode selection, wherein the driving mode is selected from one of a passive mode, a coaching mode, an assist mode, and an autonomous mode. The interface component (e.g., GUI, pedal, steering wheel, etc.) is also configured to forward input information to other vehicle control components. The interface can include a target indicator, wherein the target indicator is associated with an objective regarding vehicle operation. The interface can include an actual operation condition indicator.

BRIEF DESCRIPTION OF THE DRAWINGS

The accompanying drawings together with the description are incorporated in and form a part of this specification. They illustrate exemplary embodiments and explain exemplary principles of the disclosure. They are not intended to limit the present invention to the particular implementations illustrated therein. The drawings are not to scale unless otherwise specifically indicated.

FIG. 24 is a flow chart of exemplary user interface method in accordance with one embodiment.

FIG. 25 is a flow chart of exemplary analysis system 2500 in accordance with one embodiment.

DETAILED DESCRIPTION OF THE INVENTION

Reference will now be made in detail to the preferred embodiments of the invention, examples of which are illustrated in the accompanying drawings. While the invention will be described in conjunction with the various embodiments, it will be understood that they are not intended to limit the invention to the various embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one ordinarily skilled in the art that the present invention may be practiced without these specific details. In other instances, well known methods, procedures, components, and circuits have not been described in detail as not to unnecessarily obscure aspects of the current invention.

Systems and methods presented in the following description include efficient and effective interfacing between a user and a vehicle. Proper interactions between the user and vehicle are often important for acceptable vehicle operation. Accurate and convenient conveyance of information between a user and vehicle is typically crucial for realizing good vehicle operation results. In one embodiment, successful implementation of vehicle operations is related to achieving the performance objectives. In one exemplary implementation, conveyance of information between a user and vehicle is associated with various performance objectives. The performance objectives can be associated with operating costs (e.g., costs associated with fuel consumption, wear and tear, etc.). The user and vehicle interaction, including conveyance of information, can occur via a user interface. It is appreciated user and vehicle interaction and interfacing can be associated with various aspects of operating a vehicle and performance objectives.

The nature of user interactions with respect to vehicle operations can vary (e.g., some level of monitoring by a user, some degree of user control in vehicle operations, etc.). In one embodiment, a vehicle can operate in various modes that correspond to the nature or level of user interaction with the vehicle (e.g., a passive mode, a coaching mode, an assist mode, an autonomous mode, etc.). In one exemplary implementation, efficient and effective user and vehicle interfacing plays an important role in improving vehicle operation and increasing the likelihood of achieving performance objectives during various operating modes.

Figure 1:
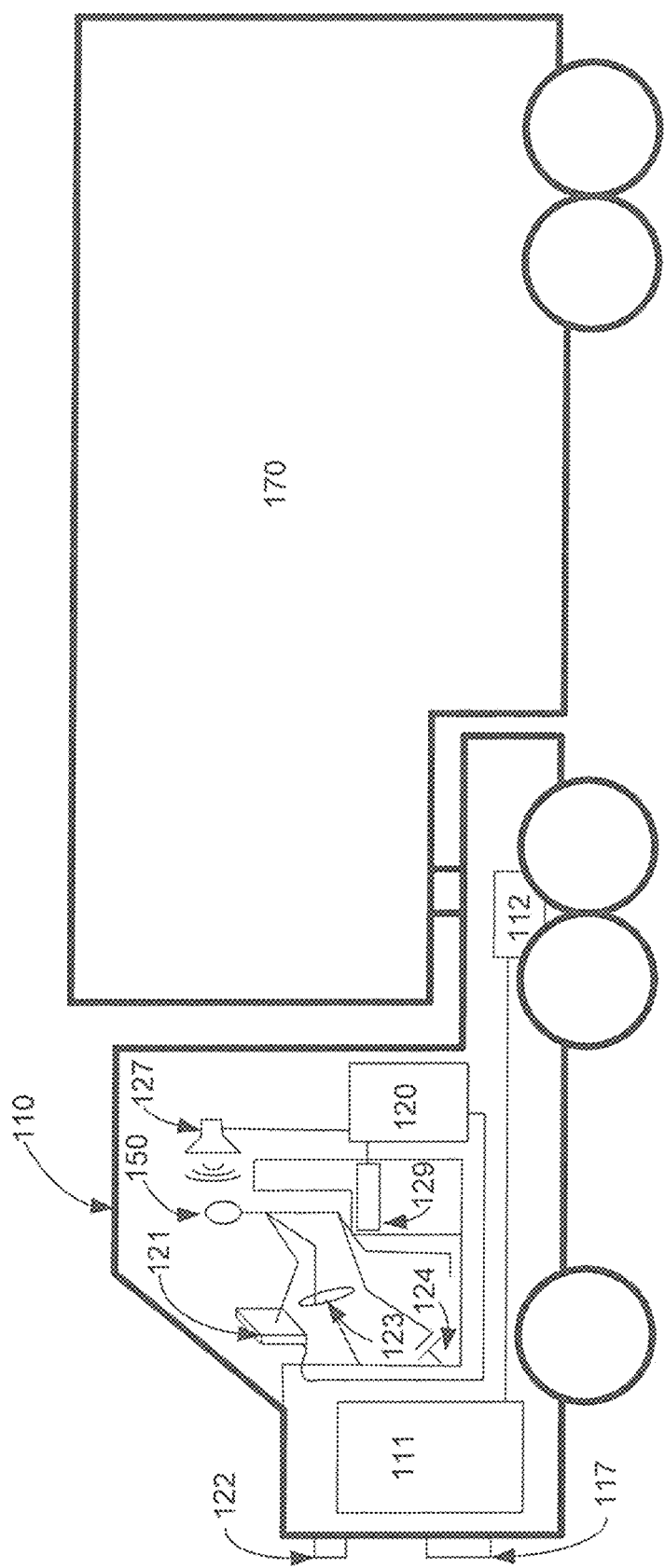
FIG. 1 is a block diagram of an exemplary vehicle in accordance with one embodiment.

FIG. 1 is a block diagram of an exemplary vehicle 100 in accordance with one embodiment. Vehicle 100 includes a cab portion 110 and a trailer portion 170, which can be coupled and uncoupled form one another (e.g. by a hitching component, etc.). Cab portion 110 includes engine 111, transmission component 112, operation analysis system 120, user interface display 121, steering wheel 123, pedals 124, audio component 127, haptic component 129, headlight 117, and sensor 122. Engine 111 creates propulsion drive for the vehicle. Transmission 112 transmits the propulsion drive to the wheels. Steering wheel 123 enables the user 150 to convey steering directions to the vehicle. Pedal 123 enables the user 115 to convey acceleration and deceleration directions to the vehicle. Headlight 117 can illuminate a path for the vehicle. Sensor 112 can sense environmental conditions (e.g., other cars, trees, visibility, etc.). Operation analysis system 120 can receive information from various components of the vehicle (engine 111, steering wheel 121, pedal 124, sensor 122, user interface display 121, etc.) and can perform various analysis with regards to vehicle operation. Operation analysis system 120 can also forward information associated with results of the analysis to various components of the vehicle (engine 111, user interface display 121, headlights 117, etc.).

It is appreciated that interface display 121 and audio component 127 can be included in a user interface. The user interface can convey information between a user and components of the vehicle. The user interface can convey information between user 150 and operation analysis system 120. In one exemplary implementation, the user interface can convey information between user 150 and other components of the vehicle (e.g., engine 111, headlights 117, etc.). In one embodiment, steering wheel 123, and pedal 124 convey control directions and information to the vehicle (e.g., engine, wheels, analysis component, etc.) and are considered part of a user interface. It is appreciated that other components can be considered part of a user interface (e.g., a turn signal stalk, headlights switch, hazard light buttons, etc.), In one embodiment, components that convey information (e.g., status, instruction, control, etc.) between a user and a vehicle can also be considered part of a user interface.

It is appreciated a user interface can be implemented in various types of vehicles (e.g., cars, trucks, boats, planes, etc.). The vehicles can have different propulsion mechanisms (e.g., combustible engine, electric engine, turbine engine, sail, human powered, etc.). The vehicle can have different user interface control mechanisms (e.g., steering, acceleration/deceleration, etc). A vehicle can have different types of steering mechanisms (e.g., a steering wheel, a joy stick, etc.).). A vehicle can have different types of acceleration/deceleration mechanisms (e.g., a pedals, dials, buttons, etc.). In one embodiment, user interface display 121 can operate as a control mechanism (e.g., touch screen up/down button is use to enter a speed value, a rotating hand gesture on an icon enters a steering instruction, etc.)

Figure 2:
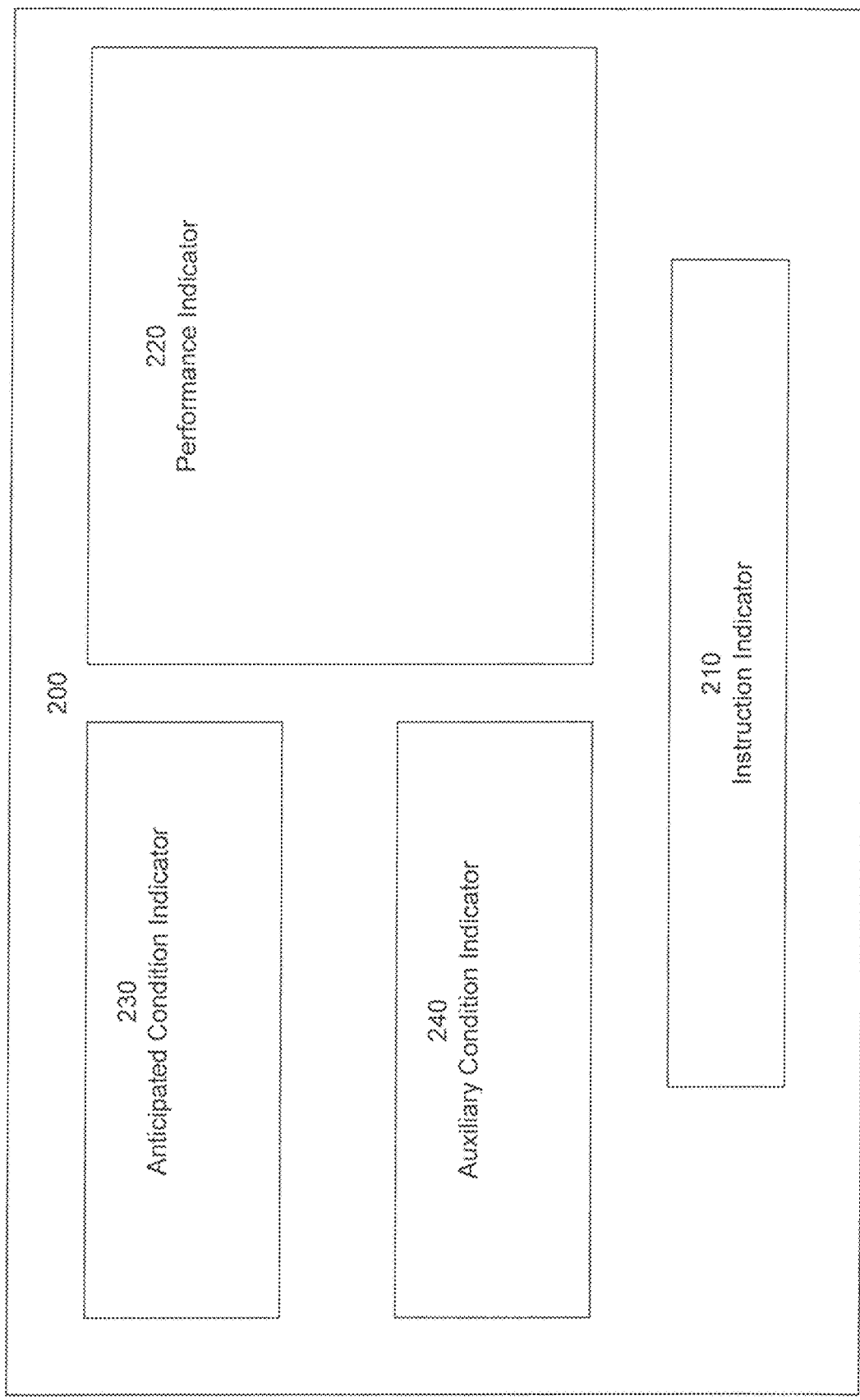
FIG. 2 is a block diagram of a user interface in accordance with one embodiment of the present invention.

FIG. 2 is a block diagram of a user interface 200 in accordance with one embodiment of the present invention. User interface 200 includes instruction indicator 210, performance indicator 220, anticipated condition indicator 230, and auxiliary indicator 240. Instruction indicator 210 is configured to enable input of user instructions to the vehicle, including conveying user instructions to operation analysis system 120. Performance indicator 220 is configured to convey information associated with the various aspects of vehicle operation. An auxiliary indicator 120 is configured to convey supplementary information, which can include information associated with ancillary functions or conditions (e.g., that can supplement, support, assist, compliment, etc.). The supplemental information can include status of headlights, air conditioning, external weather, and so on.

Figure 3:
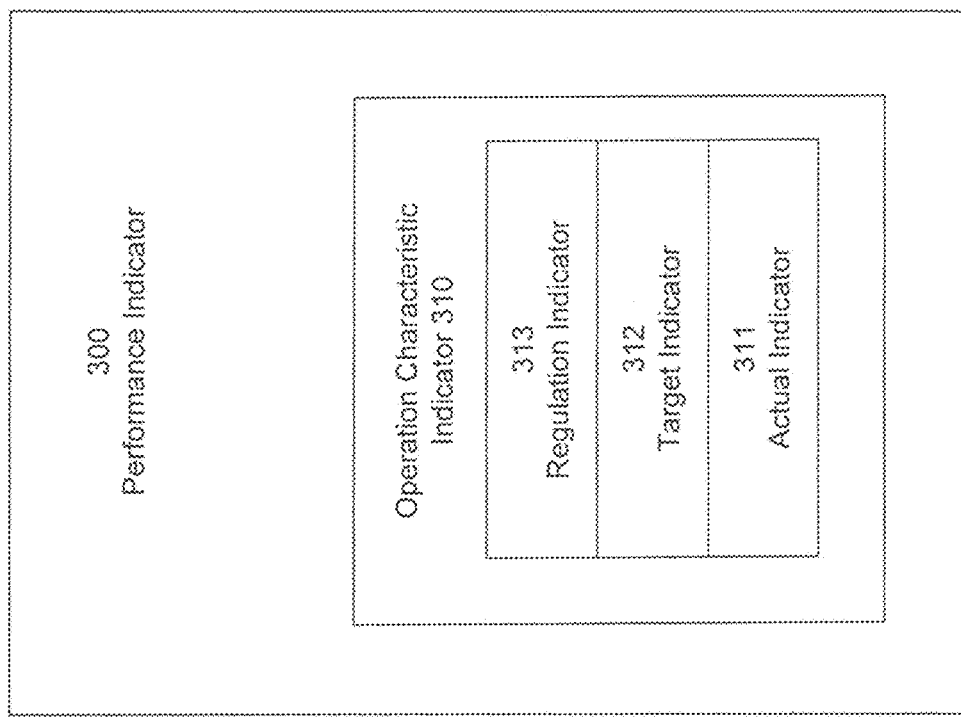
FIG. 3 is a block diagram of an exemplary performance indicator in accordance with one embodiment.

It is appreciated there can be various different types of indicators within an indicator category. FIG. 3 is a block diagram of an exemplary performance indicator 300 in accordance with one embodiment. In one embodiment, performance indicator 300 is similar to performance indicator 220. Performance indicator 300 can include an operational characteristic indicator 310 that conveys information associated with an operation characteristic (e.g., speed, acceleration, travel direction, steering, etc.). Operational characteristic indicator 310 can include an actual performance indicator 311, target indicator 312, and a regulatory indicator 313. It is appreciated the performance indicators can be associated with various metrics (e.g., speed, fuel consumption, direction, handling, etc.) associated with the vehicle operation. The actual performance indicator 311 can convey information regarding the actual performance associated with the vehicle operation. A target indicator 312 can convey information regarding a target (e.g., goal, objective, aim, aspiration, etc.) performance associated with the vehicle operation. A regulation indicator 313 can convey information regarding regulatory requirements associated with performance of a the vehicle operation (e.g., speed limit, location of a vehicle such as stopping behind a stop line, parking in a no-parking spot, distance from another object such as a fire hydrant, another vehicle, etc.).

In one embodiment, information associated with configuring and implementing a user interface are generated by a processing component. In one exemplary implementation, the processing component generates graphical display values for creating an image on a display (e.g., pixel illumination values, pixel color values, pixel brightness values, pixel intensity values, etc.). In one embodiment, information associated with configuring and implementing a user interface are generated by an analysis component. The analysis component can be similar to analysis component 120. The analysis component can also output information associated with vehicle operation and performance objectives.

In one embodiment, an operation analysis system participates in vehicle operation. The analysis system activities can depend upon a vehicle operation mode. A first mode can be considered a passive mode that includes monitoring user and vehicle operation activities and storing corresponding information. A second mode can be considered a coaching mode that includes guidance notification (e.g., advice, coaching, etc.) on vehicle operation and performance to a user. A third mode can be considered an assist mode that includes both guidance notifications and partial assistance on implementation of vehicle operations and realization of performance objective. A fourth mode can be considered an autonomous mode in which the operation analysis system controls implementation of most or all of the vehicle operations. An autonomous mode does not necessarily preclude any user interactions and can include the possibility of some user participation or interaction and interfacing (e.g., utilizing user input if the user wants to provide it, utilizing the user interface to participate in vehicle operation control in an emergency, etc.). In one embodiment, a user interface or HMI can be used to indicate or select a mode of operation that corresponds to a level of vehicle operation monitoring and control assistance capabilities. Characteristics (e.g., amount, type, etc.) of user interaction and associated user interfacing with a vehicle can vary according to the mode selection and corresponding level of vehicle operation monitoring and control assistance capabilities.

In a passive mode, an efficient and effective user interface can be useful. Even though a user is responsible for most or all of the vehicle operation control and an operation analysis system is primarily just monitoring and storing corresponding information, the user may find the efficient and effective conveyance of the monitored information helpful. In one embodiment, a user interface conveys information associated with current information vehicle operation. The user interface can include indications of vehicle speed, RPM, engine condition warning (e.g., overheating, low oil, battery problems, etc.), status of auxiliary features (e.g., such as headlights, air conditioning, emergency/parking brake, etc.), and so on. The convenient and accurate conveyance of information between the user and vehicle via the interface can improve vehicle performance. The user interface features (e.g., clear, intuitive, etc.) enable proper timing of user actions (e.g., turning steering wheel, changing pressure on pedal, etc.) that correspond to improved vehicle operation performance. The user interface features that aid and promote user realization of accurate information enable correct user decisions regarding values for vehicle operation (e.g., proper amount of acceleration/deceleration, speed, turning radius, etc.) that result in proper vehicle operation and performance objective achievement.

In a coaching mode, an efficient and effective user interface is important. The basic nature of a coaching mode is to provide advice information to a user. The coaching mode is similar to the passive mode in that the user is typically making the final control decision and implementing the corresponding vehicle operations. However, the user is utilizing advice from the operation analysis system to make the final control decision. The operation analysis system is capable of overcoming many human frailties associated with detecting conditions that impact driving operations and analyzing the conditions to derive a good plan for suggesting vehicle operations. By utilizing the advice information, a user has the opportunity to implement vehicle operations that improve or maximize vehicle performance. Thus, the conveyance of information in some ways is similar to the passive mode, only more important in that the user is actively seeking and somewhat depending upon the information for proper vehicle operation.

In an assist mode, an operation analysis system is involved in both providing information to a user and participating in implementing vehicle control actions, and an efficient and effective user interface is again very important. Given that both the user and the operation analysis system are involved in what is essentially a participatory relationship, interactions and interfacing between the user and the vehicle are critical to proper assist mode vehicle operation. In the assist mode, implementation of vehicle operations rely heavily on leveraging advantageous characteristics that both the user and operation analysis system have, while avoiding or coping with the weaknesses each have. This depends heavily on the cooperative operation realized through user and vehicle interactions and interfacing between the user and the vehicle.

With regards to an autonomous mode, it may seem that a user interface is not important since the vehicle is essentially operating automatically. However, in some ways an efficient and effective user interface is even more important in an autonomous operation mode. Given that a user may be paying no or little attention to vehicle operation as a general proposition, in those instances where user interaction may be important or critical (e.g., hazardous traffic condition, impending accident, critical operating condition, running out of fuel, etc.) getting a user's attention and conveying significant information immediately and completely can be very important. It may be a situation in which a user's intuitive or reflexive attributes could be very helpful to the autonomous system (e.g., in correctly/completely detecting a detrimental condition or situation, analyzing and implementing corrective action, etc.). In one embodiment, a vehicle can tend to give deference or added weight to the automated analysis in autonomous mode with regard to vehicle operation and performance. In some situations or conditions a user may not naturally or intuitively have the same access and insight into information regarding vehicle operation and performance an analysis system. An analysis system may have path information (e.g., an upcoming curve, a traffic light/sign after the curve, etc.) or other condition information (e.g., radar indication of another vehicle in foggy situation, detection of black ice, etc.) that a human typically has difficulty knowing or detecting. Thus, an efficient and effective user interface that conveys information conveniently and concisely in an autonomous operation mode is also very important.

In one embodiment, modes of vehicle operation are dependent on configuration and implementation of a vehicle operation analysis system. Vehicle operation analysis system can include various features, functions, and characteristics. The features, functions, and characteristics can be associated with associate with various types of analysis (e.g., artificial intelligence, expert systems, machine learning, etc.). The analysis can be based upon historical information. The analysis can produce predictive or future vehicle operation information. In one embodiment, the analysis can include detection and identification of various conditions (e.g., traffic conditions, weather conditions, etc.), different types of analysis (e.g., logical, deductive, inferential, predictive, etc.), and participating in implementation of the vehicle operations (e.g., directing control of acceleration/deceleration activities, steering activities, etc.). In one embodiment, the features, functions, and characteristics of a vehicle operation analysis system are configured to contribute to realization of performance objectives.

Vehicle operation and associated user interaction with the vehicle often involves a significant amount of complex and complicated considerations. There are numerous factors that can impact vehicle operation, such as characteristics of the vehicle (e.g., weight, horsepower, turning radius, etc.), path characteristics (e.g., curves, topography, grade, etc.), environmental characteristics (e.g., weather, traffic congestion, roadway condition, etc.) and so on. There are a number of different metrics (e.g., speed, acceleration/deceleration, turning rate, drive shaft revolutions per minute (RPM) torque, etc.) that can be utilized to describe vehicle operation characteristics. Furthermore, a vehicle can be operated based upon various objectives. The objectives can include performance objectives (e.g. traveling a distance in a particular amount of time, maintaining relatively low costs, fuel efficiency, etc.). Properly addressing these considerations can include conveyance of very complex and complicated information.

It is appreciated that a user interface can include different types of indicators that convey information. A user interface can include indicators that convey information via visual cues (e.g., text, symbols, images, icons, colors, etc.). A user interface can include indicators that convey information via audio cues (e.g., sounds, alarms, horns, voice simulation, words, songs, etc.). A user interface can include indicators that convey information via tactile cues (e.g., vibrations, resistance, force, electricity, heat, cold, etc.). A user interface can convey information via different types of indicators included in various media and mechanisms.

In one embodiment, a user interface can include a display component for displaying information. There can be various different types of display components (e.g., a monitor, a screen, a tablet, a heads-up display, integrated with another component such as a windshield, a projection, etc.). In one exemplary implementation a user interface can include a graphical user interface (GUI). The information can be conveyed via visual cues. It is appreciated characteristics of the visual cues can enable efficient and effective conveyance or information related to vehicle operation and performance objectives. The shape of the indicator can be configured to convey characteristics or status of the information. An indictor in the shape of an arrow can be used to indicate a change in amount (e.g., an arrow pointing up can indicate an increase, arrow pointing down can indicate a decrease, etc.). An indicator in the shape of an "X" or image with a diagonal bar through it can indicate an undesirable condition or characteristic. A color of the indicator can be configured to convey characteristics or status of the information. A green color indicator can convey an operation is within an acceptable or desirable characteristic or condition. A yellow color indicator can convey a warning that an operation is approaching an unacceptable or undesirable characteristic or condition. A red color indicator can convey that operations are in an unacceptable or undesirable characteristic or condition.

The information can be displayed via a graphic image on a user interface display and the graphic image can be configured in a shape and color that is readily observable, discernable, and assists with an intuitive understanding. In one exemplary implementation, an icon or image of a vehicle component (e.g., steering wheel, pedal, etc.) and action indicator (e.g., arrow indicating a turn in the steering wheel, up/down arrow indicating force on the pedal, etc.) are presented or displayed under a highlighted (e.g., flashing, red, etc.) prevent or avoid indicator (e.g., a big "X", circle with a line through its center, etc.) and conveniently conveys that a user should avoid or cease a particular action related to the vehicle component. These features of the presentation enable quick and reliable user detection, analysis, and response. The highlighting grabs the user's attention, the component image instantaneously conveys the component involved, the action indicator similarly conveys the action involved, and the prevent indicator intuitively indicates the correct user reaction. The quick and reliable conveyance of the information also enables the user to make an almost instantaneous analysis of the corrective action to achieve appropriate vehicle operations. The quick and reliable conveyance of the information contribution to the detection and analysis enables rapid and accurate implementation of the appropriate (e.g., desirable, corrective, advantageous, performance objective, etc.) action on the vehicle operation.

In one embodiment, a user interface can include an audio component for conveying information via audio cues. In one embodiment, a user interface includes a speaker configured to convey audio sounds. In one exemplary implementation a user interface includes a microphone configured to convey audio sounds. It is appreciated characteristics of the audio cues can enable efficient and effective conveyance or information related to vehicle operation and performance objectives. Differences in types of sounds (e.g., alarm, horn, ping, etc.) and volume of the sounds can convey characteristics or status of the information. In one embodiment, a load alarm indicates an imminent danger. In one exemplary implementation, changes in a ping sound indicate changes corresponding to vehicle operations (e.g., changing acceleration/deceleration in the vehicle, increasing/decreasing proximity to an object, need for more/less user interaction with a vehicle component, etc.).

A user interface can include audio features that can enable input and output of information in audio form. In one embodiment, a user interface can convey audio related information to a user (e.g., conveyance of verbal information, alarm sounds, etc.). In one embodiment, a user interface conveys audio related information to an operation analysis system via sound detection and recognition (e.g., sound of user voice, car horns, railway crossing gate bell, etc.). User interface audio features can be implemented in various ways (e.g., integrated in a user interface display component, separate speaker component, etc.). Audio sounds can also be conveyed in a convenient and intuitive manner that enables accurate and intuitive detection of a condition, rapid analysis, and implementation of a vehicle operation activity. In one exemplary implementation, different characteristics of an audio sound can convey information associated with vehicle operation. A type of sound (e.g., alarm, ping, etc.) may correspond to a type of condition or operation and a characteristics of a sound (e.g., volume, frequency, duration between occurrence, etc.) can convey information regarding the condition or operation (e.g., seriousness or immediacy of the hazard, rate of change in the activity, etc.). A type of sound (e.g., alarm, siren, horn, etc.) can convey a hazard and a volume of the sound can convey the seriousness or immediacy of the hazard. A type of sound (e.g., alarm, pinging, etc.) can be associated with a particular operation activity (e.g., pressing a pedal, turning a steering wheel, etc.) and changes in the volume or occurrence of the sound can convey a desire/need for a change in the activity (e.g., disengage in an activity such as stop pressing a gas pedal and so on, engage in an activity such as pressing break and so on, increase/decrease an activity such as alter a steering wheel rotation and so on, etc.), The characteristics of the sound enable quick and reliable detection and conveyance of information, and also enables quick and reliable analysis and response to the information. The type and volume of the sound can get a user's attention and convey the condition involved in a manner the user is likely to interpret rapidly and accurately. The rapid and accurate conveyance of the information also enables an accurate and almost instantaneous analysis and generation of actions that achieve appropriate vehicle operation. The quick and reliable conveyance of the information contribution to the detection and analysis in turn enables rapid and accurate implementation of the appropriate (e.g., desirable, corrective, advantageous, performance objective, etc.) action on the vehicle operation.

In one embodiment, a user interface can include a sensory component for conveying information via tactile cues. It is appreciated characteristics of the tactile cues can enable efficient and effective conveyance or information related to vehicle operation and performance objectives. In one embodiment, a vehicle component (e.g., steering wheel, pedal, etc.) can offer more resistance to a user initiated movement or can initiate a force or pressure against the user contact (e.g., initiate a turn of a steering wheel even if a user hand is resting on it, initiate a raising of a pedal even if a user foot is resting on it, etc.). In one exemplary implementation, changes in a tactile can correspond to changes in vehicle operation. In one exemplary implementation, changes in a vibrations of a vehicle component (e.g., steering wheel, pedal, etc.) indicate changes corresponding to vehicle operations (e.g., changing acceleration/deceleration in the vehicle, need for more/less user interaction with a vehicle component, such as amount of a steering wheel rotation or pressing on a pedal, and so on.).

It is appreciated that multiple aspects or mechanisms of a user interface can be used cooperatively to rapidly and accurately convey information. In one embodiment, a user interface display conveys information visually and a user interface audio features convey information via sounds. Similar vehicle operation information can be conveyed cooperatively in a manner that increases the likelihood of accurate conveyance. In one exemplary implementation, a user interface display flashes an icon indicating an instruction to break or reduce speed while at substantially the same time an audio feature emits a verbal instruction to beak or reduce speed. Different vehicle operation information can be conveyed cooperatively in a manner that increases the amount of information that is conveyed. In one exemplary implementation, a user interface display presents an icon indicating a change in vehicle direction or path while at substantially the same time an audio feature emits a verbal indication of a performance objective achievement.

The rapid and accurate conveyance of the information by a user interface (e.g., via a user interface display, audio features, etc.) and corresponding implementation of the appropriate action enables improved vehicle operations and increased likelihood of achieving performance objectives. In one embodiment, the user interface enables cooperative operation of a vehicle leveraging the strengths of user capabilities and vehicle component capabilities (e.g., sensors, automated vehicle operation analysis, etc.), while avoiding capability shortcomings of the user and the vehicle components. In one exemplary implementation, sensors capabilities (e.g., camera, radar. laser, infrared, etc.) associated with detecting a condition (e.g., object, other vehicle, roadway condition, etc.) and analysis capabilities (e.g., artificial intelligence, result predictions, etc.) enable generation of accurate information without human frailties for either automated or a user implementation of a control action. The rapid detection, analysis, and generation of control information enables quick corrective operation action and less operation in undesirable states resulting in improved vehicle operation and relaxation of performance objective. Vehicle operation information generated from user capabilities (e.g., intuitive input, rapid reflexive input, take over in emergency/analysis system failure, etc.) can be input via a user interface. Again the rapid detection, analysis, and generation of control information enables quick corrective operation action and less operation in undesirable states resulting in improved vehicle operation and relaxation of performance objective. The conveyance of accurate information via the user interface can ensure operation in a correct or desirable state or range and avoid operation in incorrect or undesirable state or range, resulting in improved vehicle operation and relaxation of performance objective.

It is appreciated an analysis system and vehicle condition detection or sensor components enable improved vehicle operation in a manner that overcomes a number of frailties associated with user control. Many vehicle condition detection or sensor components (e.g., radar, laser, lidar, sonar, altitude meter, incline sensor, traction slippage sensor, etc.) can detection or sense conditions a human can not naturally or intuitively detect. Some of this information in its raw form can be very difficult for a user to interpret and analyze while an analysis component can handle interpretation and analysis of the information from the detector. In one embodiment, the analysis component is able to translate the information into a convenient easy to understand format via a user interface for utilization in user control operations. An analysis component can also have access to large amounts of information (e.g., stored locally, accessed from remote location, received from vehicle sensors/detectors, GPS information, etc.) that a user does not naturally have access to. An analysis component can also the ability to rapidly and accurately process the information in a manner the user can not. Even if a user could over an extended period of time get access to the information and perform some of the processing, a user can not typically perform gather the information and perform the processing or analysis within timing constraints to make the results useful or relevant to a currently or imminently implemented vehicle operation and performance objective. In addition, user gathering of the information and performance of the processing or analysis typically involves some level of human frailty, giving rise to accuracy and repeatability issues that an analysis component and vehicle detectors do not have. The analysis component and vehicle detectors capabilities can enable improved vehicle operation and realization of performance objectives.

With regards to sensors, it is appreciated a vehicle can have sensors that detect conditions external to vehicle components (e.g., other vehicles, objects, weather, etc.) and also have sensors that detect internal vehicle conditions or conditions associated with vehicle operations (e.g., engine temperature, RPM, break wear, tire pressure, oil level, etc.).

In modes involving user participation in vehicle operation, having rapid and convenient conveyance of information between the user and the analysis component can improve implementation of the analysis component and vehicle detectors capabilities can enable improved vehicle operation and realization of performance objectives. In one exemplary implementation of an assist mode, the system relies on the user to receive information via the user interface and implement the vehicle operations based upon information associated the analysis component and vehicle detector capabilities that enable improved vehicle operation and realization of performance objectives. The rapid conveyance of accurate information via the user interface can ensure operation in a correct or desirable state or range and avoid operation in incorrect or undesirable state or range, resulting in improved vehicle operation and relaxation of performance objective.

In one embodiment, user input is utilized to improve analysis system operations. In one exemplary implementation, user input can be utilized to reduce the number of possibilities/contingencies an artificial intelligence (AI) analysis tries to computationally analyze. By reducing the number of possibilities/contingencies the analysis component can provide faster results. It an also free up analytic component resources to participate in additional processing and other activities. In one embodiment, user input can be utilized by artificial intelligence or machine learning operations to improve algorithms abilities to provide accurate and beneficial results.

Figure 4:
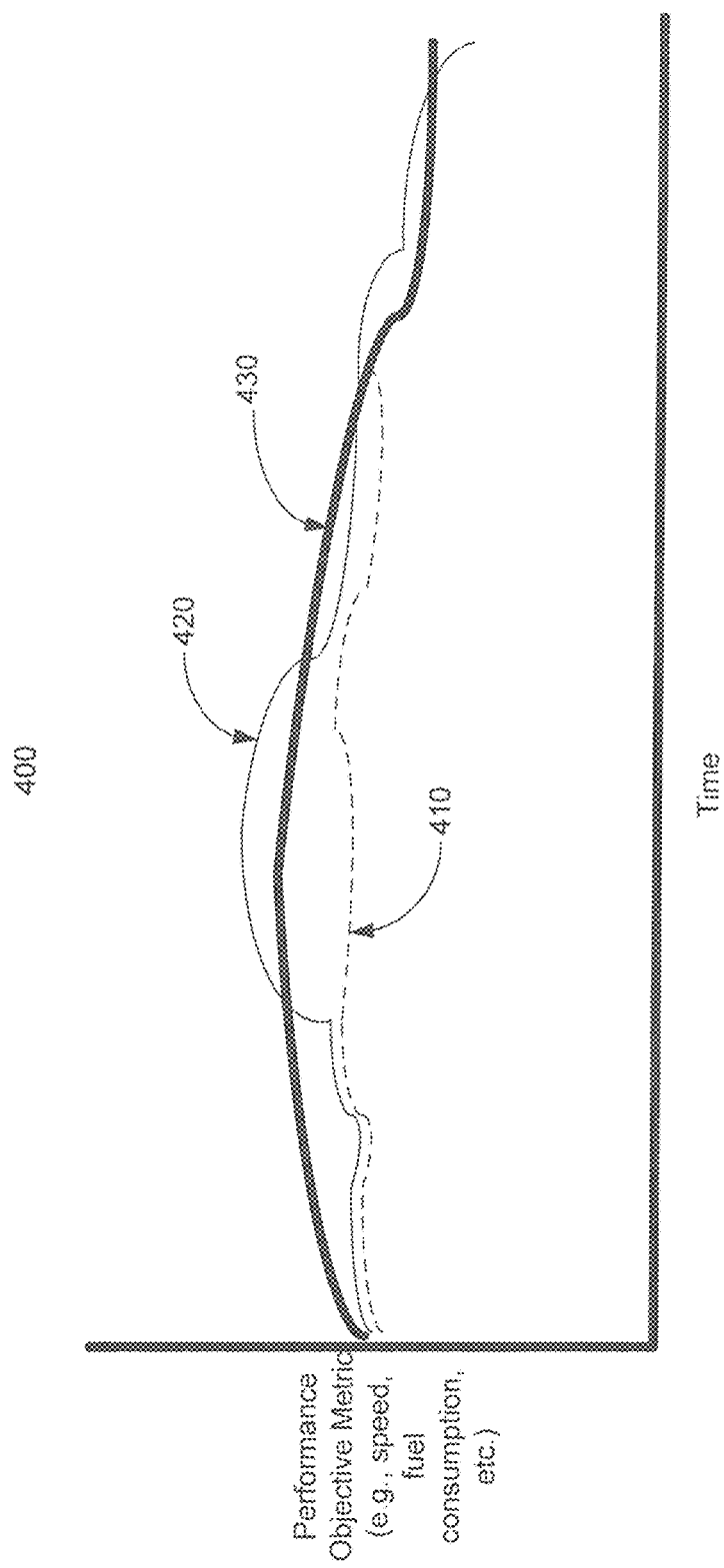
FIG. 4 is an illustration of an exemplary performance indicator in accordance with one embodiment.

It is appreciated that an indicator can be configured to convey information about one or more of past, present, and future operations. FIG. 4 is an illustration of an exemplary performance indicator 400 in accordance with one embodiment. Performance indicator 400 conveys information associated with a performance objective related metric (e.g., speed, fuel consumption, safety, etc.) over time. The dashed line 410 can represent current trip information. The thin solid line 420 can represent an optimal performance based upon previous trips made by the user. The solid line 430 can represent performance based upon the performance of another user. In one embodiment, the other user is considered a professional or exceptional vehicle operator.

A user is typically a human and a vehicle is often considered a machine. In one embodiment, an interface is considered a human machine interface (HMI) that participates in activities related to vehicle operations. A human user and a vehicle typically each have abilities that can impact vehicle operation and performance. A human user typically has sensory capabilities, reflexive capabilities, and cognitive capabilities. In one embodiment, a machine includes detection capabilities and control assistance capabilities. The control assistance capabilities can vary from detecting and gathering information on vehicle operations to autonomous control the vehicle operations. Being able to efficiently and effectively convey information between the vehicle and the user is important to implementing desirable vehicle operation.

A user interface can include vehicle operation instruction buttons/icons that are user to input information from a user regarding vehicle operation characteristics. In one embodiment, an indicator can be utilized to convey output information and also as a vehicle operation instruction button/icon to input information. In one exemplary implementation, a display component includes a screen with interactive capabilities (e.g., capacitive sensing, touch screen capabilities, etc.) configured to convey information from the vehicle to the user and from the user to the vehicle.

Figure 5:
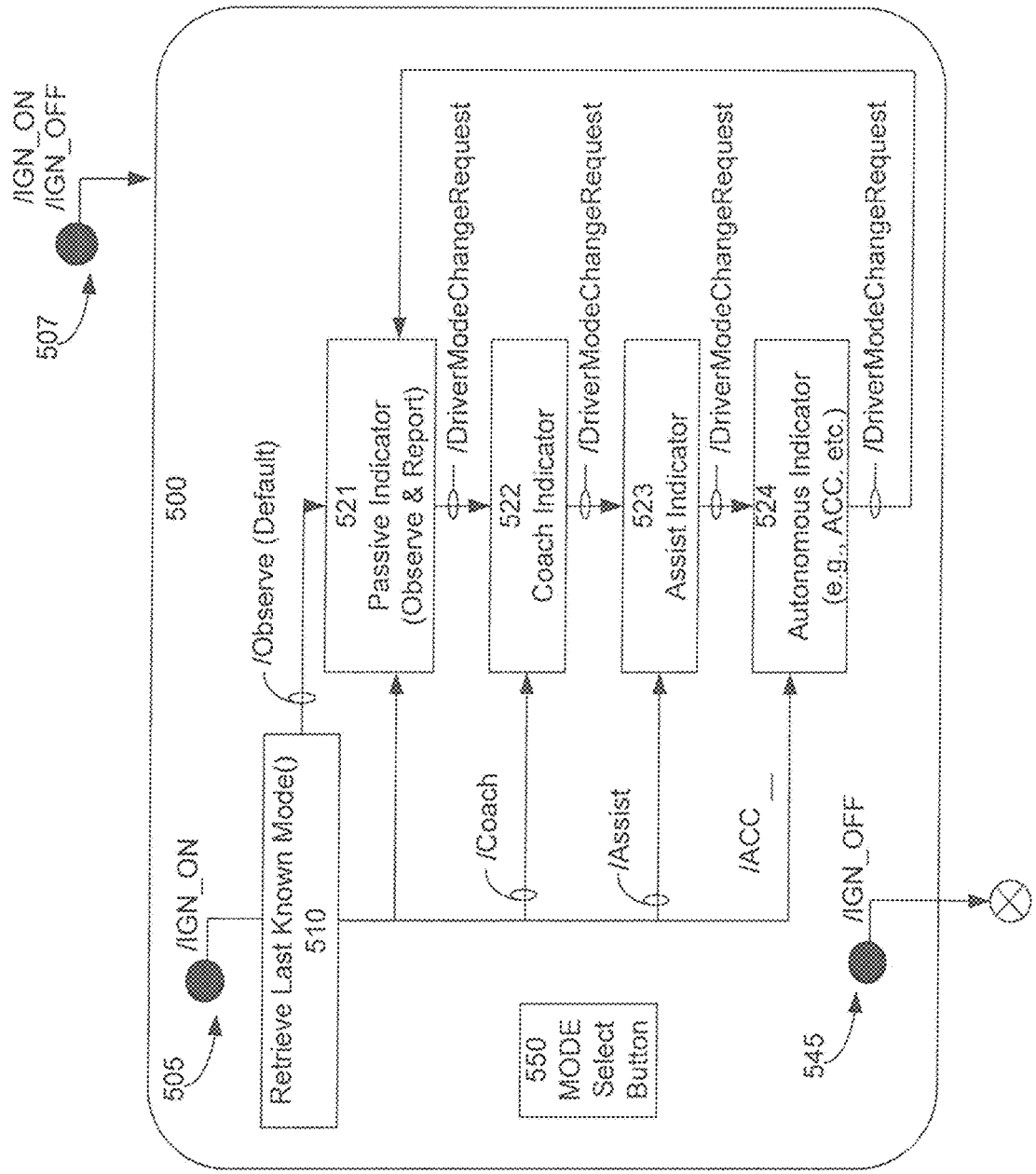
FIG. 5 is a block diagram of an exemplary mode configuration user interface initial state in accordance with one embodiment.

In one embodiment, user interfacing includes information associated lane changes. In one exemplary implementation, surrounding traffic conditions (e.g., stopped, slow, merging, etc.) are detecting and a lane change is indicated. In one exemplary implementation, the lane change suggestion is related to realization of a performance objective (e.g., maintain safety, conserve fuel by avoid slow down, etc.), FIG. 5 is a block diagram of an exemplary mode configuration user interface 500 initial state in accordance with one embodiment. The user interface includes an ignition on button/icon 505, passive mode indictor 521, a coach mode indicator 522, assist mode indicator 523, autonomous mode indicator 524, mode select button/icon 550, and ignition off button 545. Ignition on button/icon 505 indicates the vehicle ignition has been activated. In one embodiment, ignition on button/icon 505 can also be used to activate the ignition (e.g., press, touch screen, etc.). Passive mode indictor 521, coach mode indicator 522, assist mode indicator 523, and autonomous mode indicator 524 convey information regarding operation of the vehicle in the respective mode. In one exemplary implementation, mode configuration information is conveyed (e.g., output, displayed, etc.) within 1500 milliseconds of ignition "on" being activated. In one embodiment, passive mode indictor 521, coach mode indicator 522, assist mode indicator 523, and autonomous mode indicator 524 can also be used to activate the respective mode (e.g., press, touch screen, etc.). In one exemplary implementation, mode selection button/icon 550 is used to activate the respective mode. Ignition off button/icon 545 indicates the vehicle ignition has been deactivated. In one embodiment, ignition off button/icon 545 can also be used to deactivate the ignition. It is appreciated that ignition on/off activation can come from other components 507 (e.g., key, fob, other button, etc.).

It is appreciated a user interface can be utilized to convey information regarding a number of vehicle operation characteristics (e.g., speed, acceleration/deceleration, turning radius, etc.) and corresponding metrics (e.g., miles per hour (MPH), kilometers per hour (km/h), pedal movement/position, degrees of steering wheel rotation, etc.). For ease of explanation, many of the features of a user interface are explained herein in terms of Adaptive Cruise Control (ACC) vehicle operation characteristics and corresponding metrics. One of ordinary skill in the art recognizes that user interface presented features can also be utilized with other vehicle operation characteristics and corresponding metrics.

Figure 6:
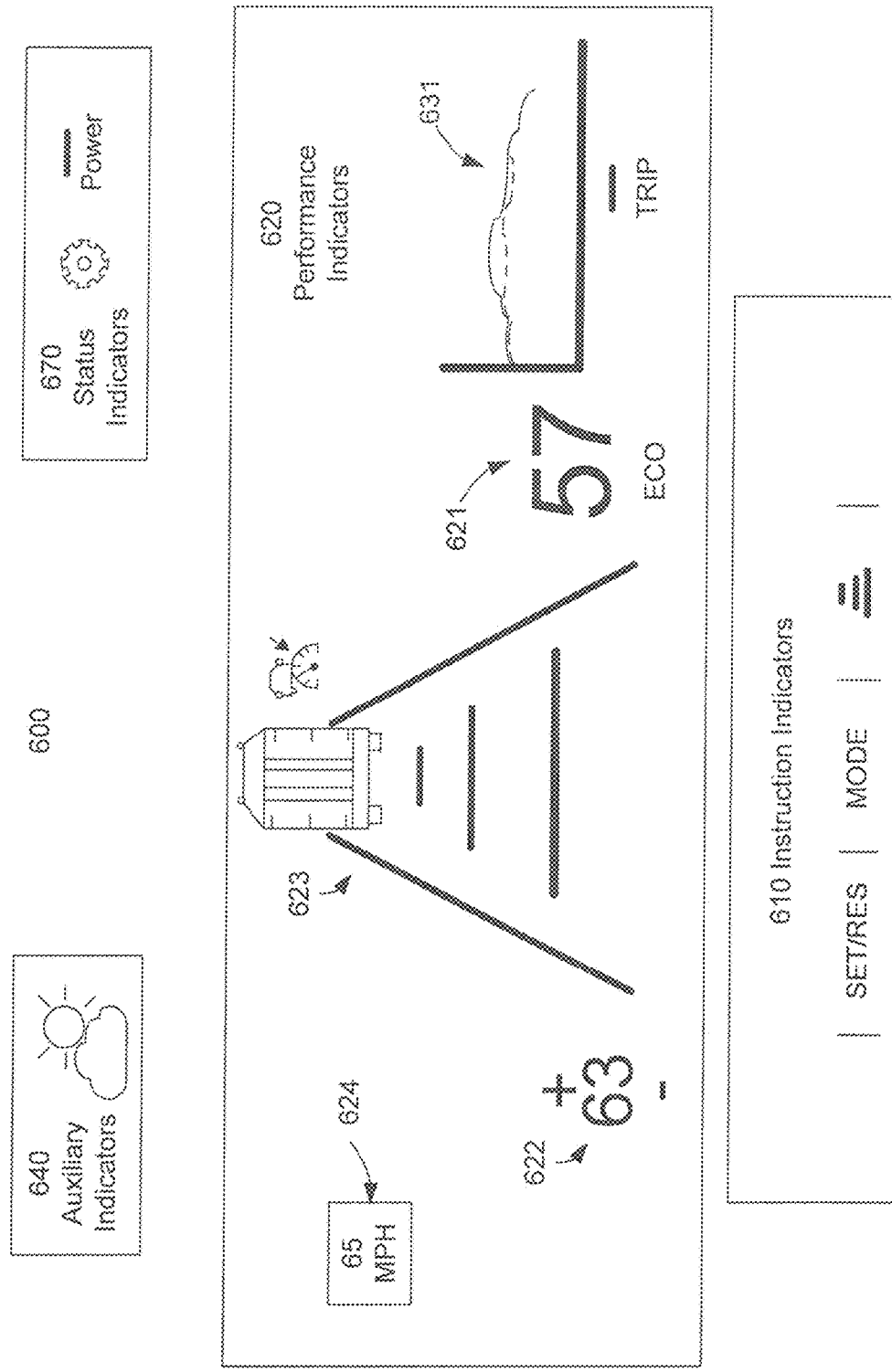
FIG. 6 is a block diagram of an exemplary user interface in accordance with one embodiment.

FIG. 6 is a block diagram of an exemplary user interface 600 in accordance with one embodiment. User interface 600 includes instruction indicators 610, performance indicators 620, auxiliary indicators 640, and status indictors 670. Instruction indicators 610 include a plurality of vehicle operation instruction button/icons. In one embodiment, the vehicle operation instruction button/icons include a set/resume button/icon, a mode button/icon, and a distance button/icon. Performance indicators 620 includes a speed indicator 621 for the speed system a vehicle it traveling at a given point in time, a user instructed speed indicator 622, a actual distance indicator 623, a regulatory speed indicator 624, a performance objective realization indicator 631. Auxiliary indicators 640 includes an environmental weather condition indicator. Status indicators 670 include an operation analysis system tools indicator and an operation analysis tools power indicator.

In one exemplary implementation, an Adaptive Cruise Control (ACC) on/off button (not shown) is utilized by a user to start ACC. Upon activation of the ACC on/off button, information regarding a default speed or a no default speed indication is retrieved (e.g., from a memory, register, etc.) and the initial ACC speed is set accordingly. The set/resume button/icon can be used to convey user instructions regarding ACC operations. The set portion can convey a user instruction to establishing a speed for the ACC that correspond to a speed the vehicle is currently traveling at. The resume portion can convey a user instruction to resume a prior stored speed.

A mode button/icon can be used to convey user directions to operate a vehicle in a particular mode. The modes can include a passive mode, a coach mode, an assist mode, and an autonomous mode. In one embodiment the autonomous mode includes ACC.

In one embodiment, a distance instruction button/icon can be used to convey user directions to regarding a distance to maintain between other vehicles.

Figure 7:
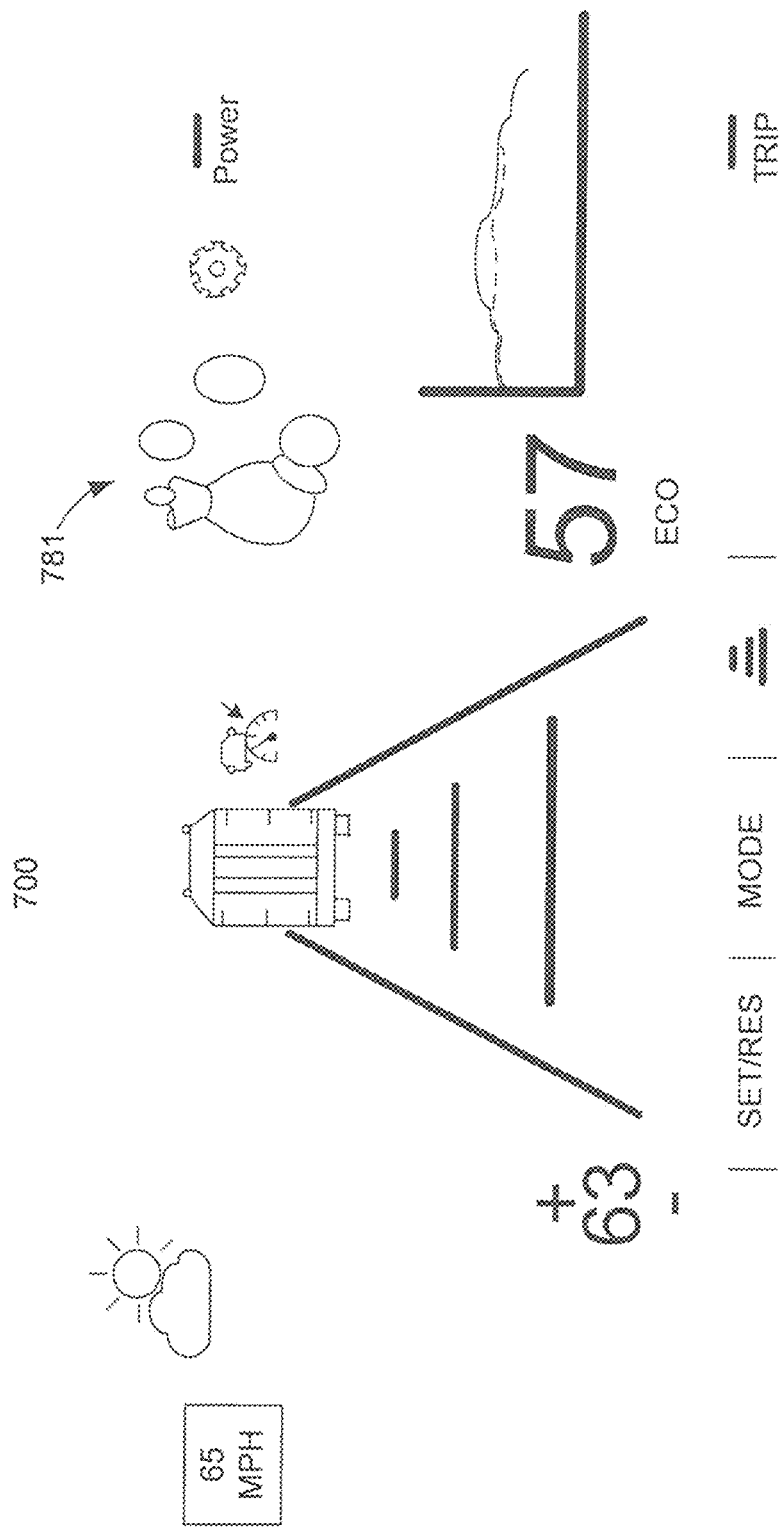
FIG. 7 is a block diagram of an exemplary user interface conveying performance rewards as a trip progresses in accordance with one embodiment.

In one embodiment, incentives are available to encourage realization of a performance objective. FIG. 7 is a block diagram of an exemplary user interface 700 conveying performance rewards as a trip progresses in accordance with one embodiment. User interface 700 includes active incentive indication 781 that displays additional coin icons as performance objectives are realized.

Figure 8:
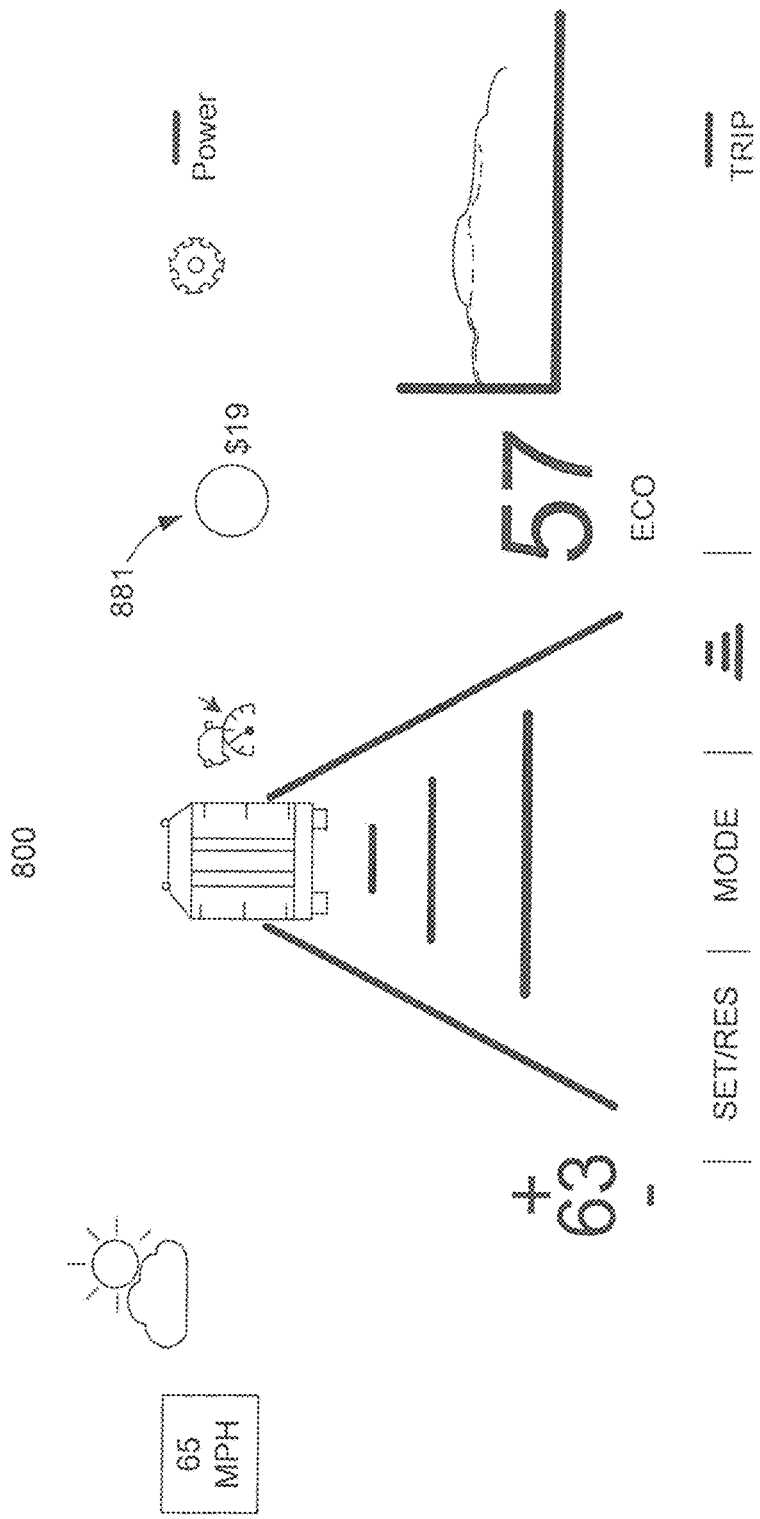
FIG. 8 is a block diagram of an exemplary user interface conveying total performance rewards in accordance with one embodiment.

FIG. 8 is a block diagram of an exemplary user interface 800 conveying total performance rewards in accordance with one embodiment. User interface 800 includes total incentive indication 881 that displays total reward values associated with realized performance objectives.

A user interface can convey information associated with a new or changing dynamic element (e.g., a leading vehicle detected, road/route advisory change, etc.). In one embodiment, the dynamic elements are taken into account to increase realization of performance objective (e.g., safety, fuel efficiency, etc.). The dynamic elements can include traffic info, road geometry and topology, weather and so on. The dynamic element indications can also convey information to help a user understand rational associated with operating operation analysis system actions.

Figure 9:
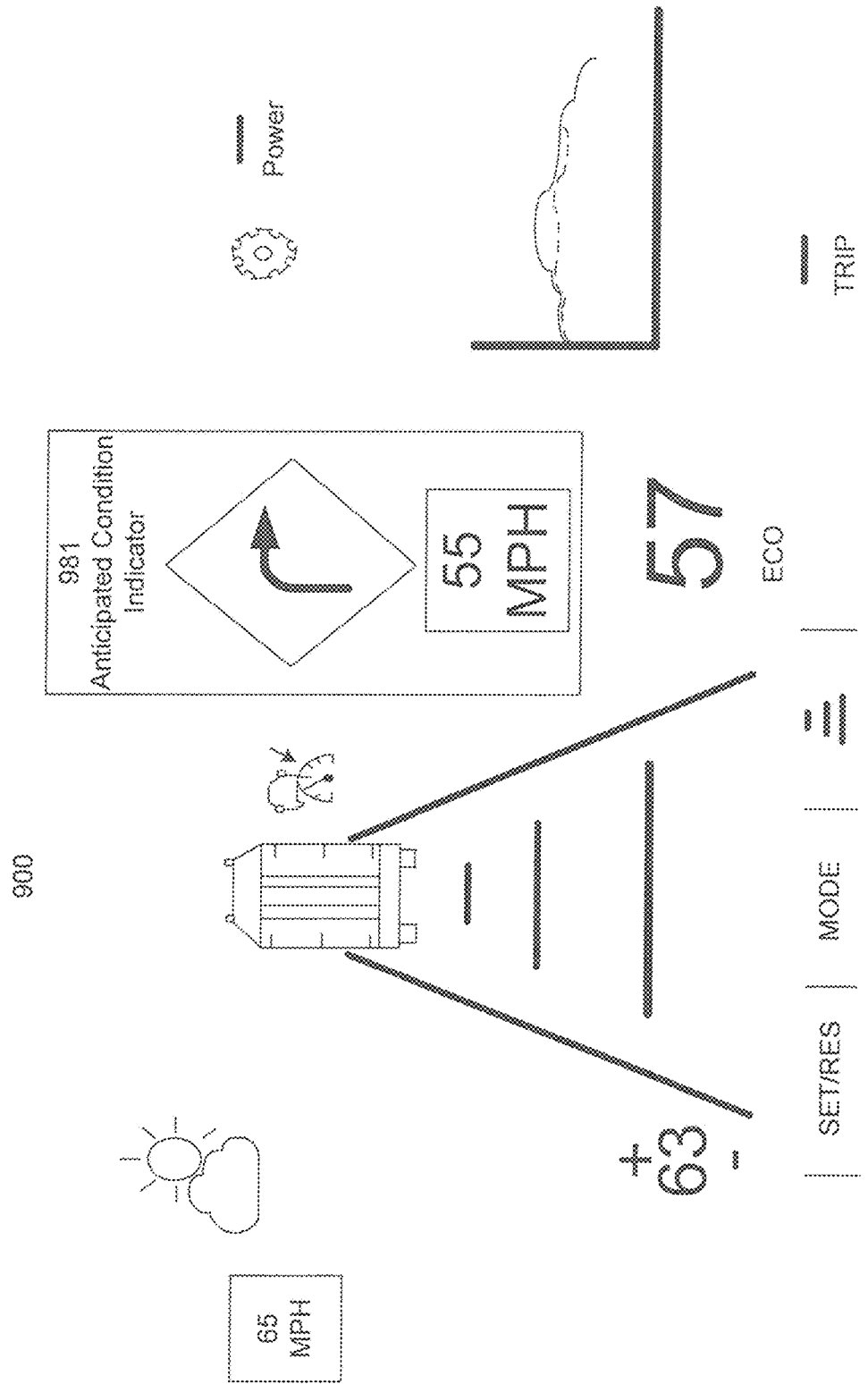
FIG. 9 is a block diagram of an exemplary user interface conveying dynamic elements in accordance with one embodiment.

FIG. 9 is a block diagram of an exemplary user interface 900 conveying dynamic elements in accordance with one embodiment. User interface 900 includes anticipated condition indicator 981 that displays an anticipated condition (e.g., change of direction, change in upcoming regulatory speed, etc.).

Figure 10:
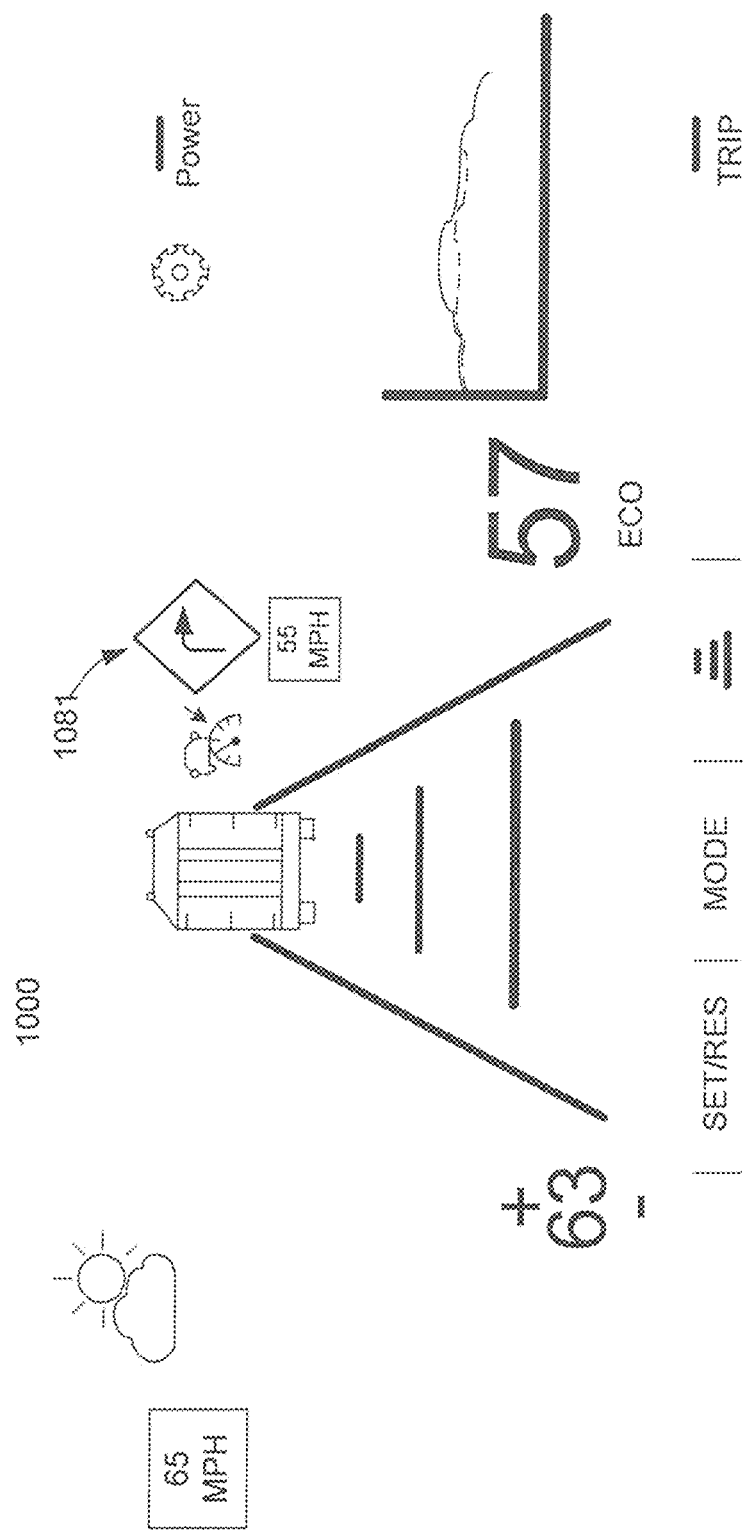
FIG. 10 is a block diagram of an exemplary user interface conveying dynamic elements arranged in a different configuration in accordance with one embodiment.

FIG. 10 is a block diagram of an exemplary user interface 1000 conveying dynamic elements arranged in a different configuration in accordance with one embodiment. User interface 1000 includes anticipated condition indicator 1081 that displays an anticipated condition. Anticipated condition indicator 1081 is similar to anticipated condition indicator 981 except smaller in size and in a difference location on the display 1181.

Figure 11:
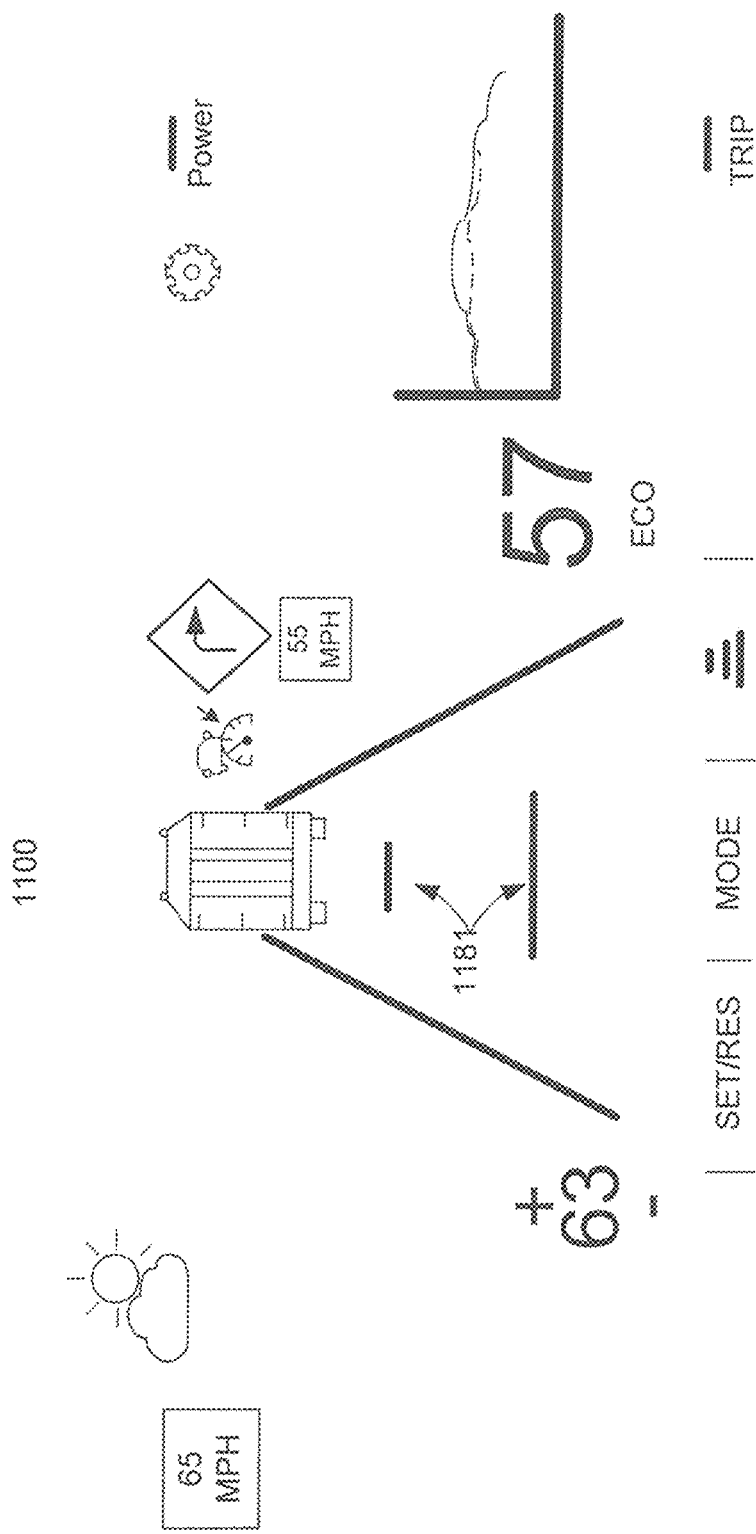
FIG. 11 is a block diagram of an exemplary user interface conveying a change in dynamic elements in accordance with one embodiment.

FIG. 11 is a block diagram of an exemplary user interface 1100 conveying a change in dynamic elements in accordance with one embodiment. In one embodiment, the lead vehicle indicator is updated to reflect a change in spacing between the vehicles. In one exemplary implementation, the gap indictors 1181 changes from three in FIG. 10 to two in FIG. 11. In one embodiment, the difference in distances between lines on the display 1181 can conveniently and intuitively conveys a difference in distance or location of the other vehicle. In one exemplary implementation, the reduction in the number of the distance indication lines can also conveniently and intuitively convey a difference in distance or location of the other vehicle.

Figure 12:
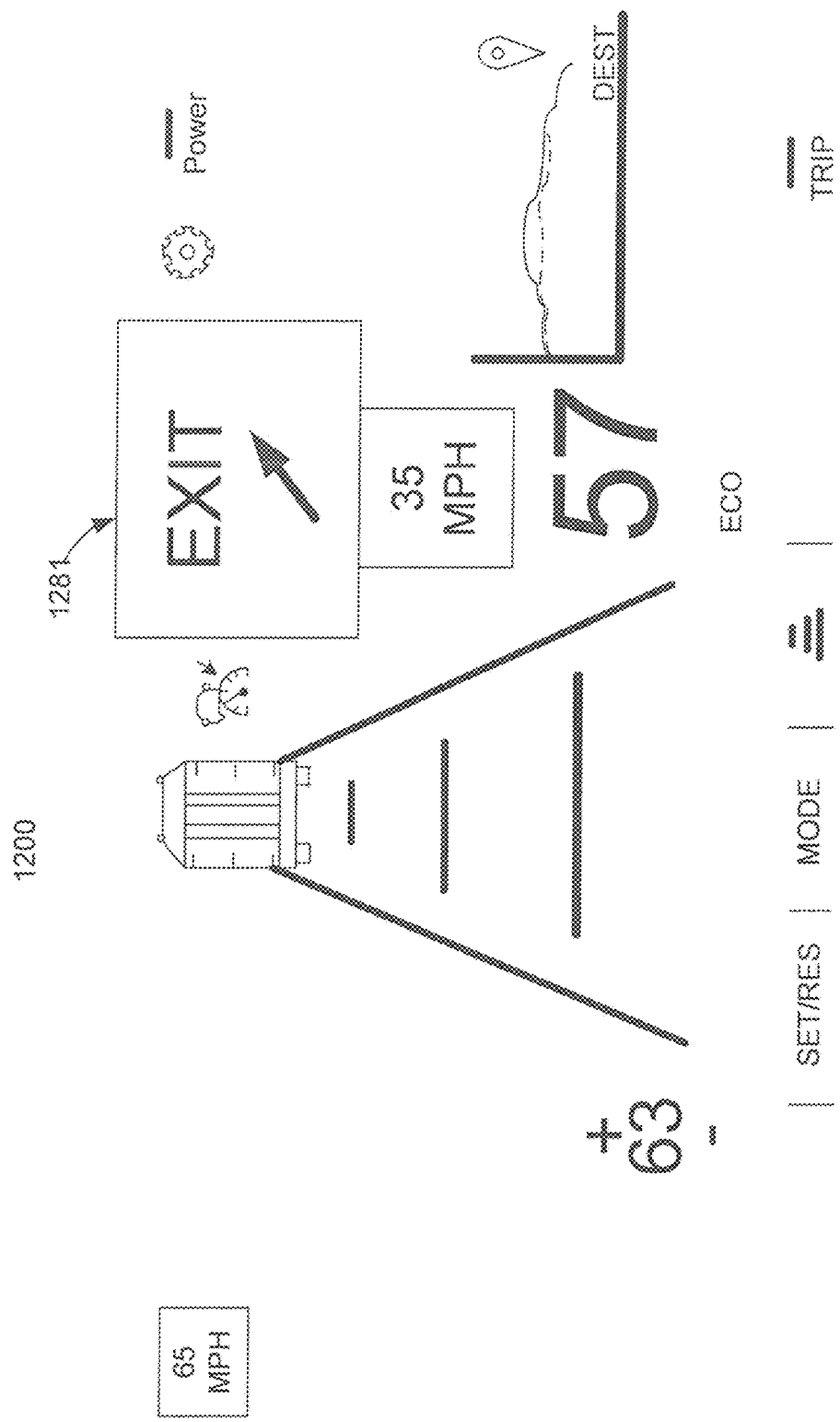
FIG. 12 is a block diagram of an exemplary user interface conveying an anticipated change in accordance with one embodiment.

FIG. 12 is a block diagram of an exemplary user interface 1200 conveying an anticipated change in accordance with one embodiment. In one embodiment, an indication 1281 of an upcoming exit is conveyed. Various things can trigger the indication of the anticipated change. The display of the upcoming exit can be based upon apriori knowledge of a trip route, trip route based upon users historical pattern, estimation of vehicle travel path based on vehicle dynamics (e.g., position on the road, driver initiated lane change towards exit lane, driver steering action, etc.).

Figure 13:
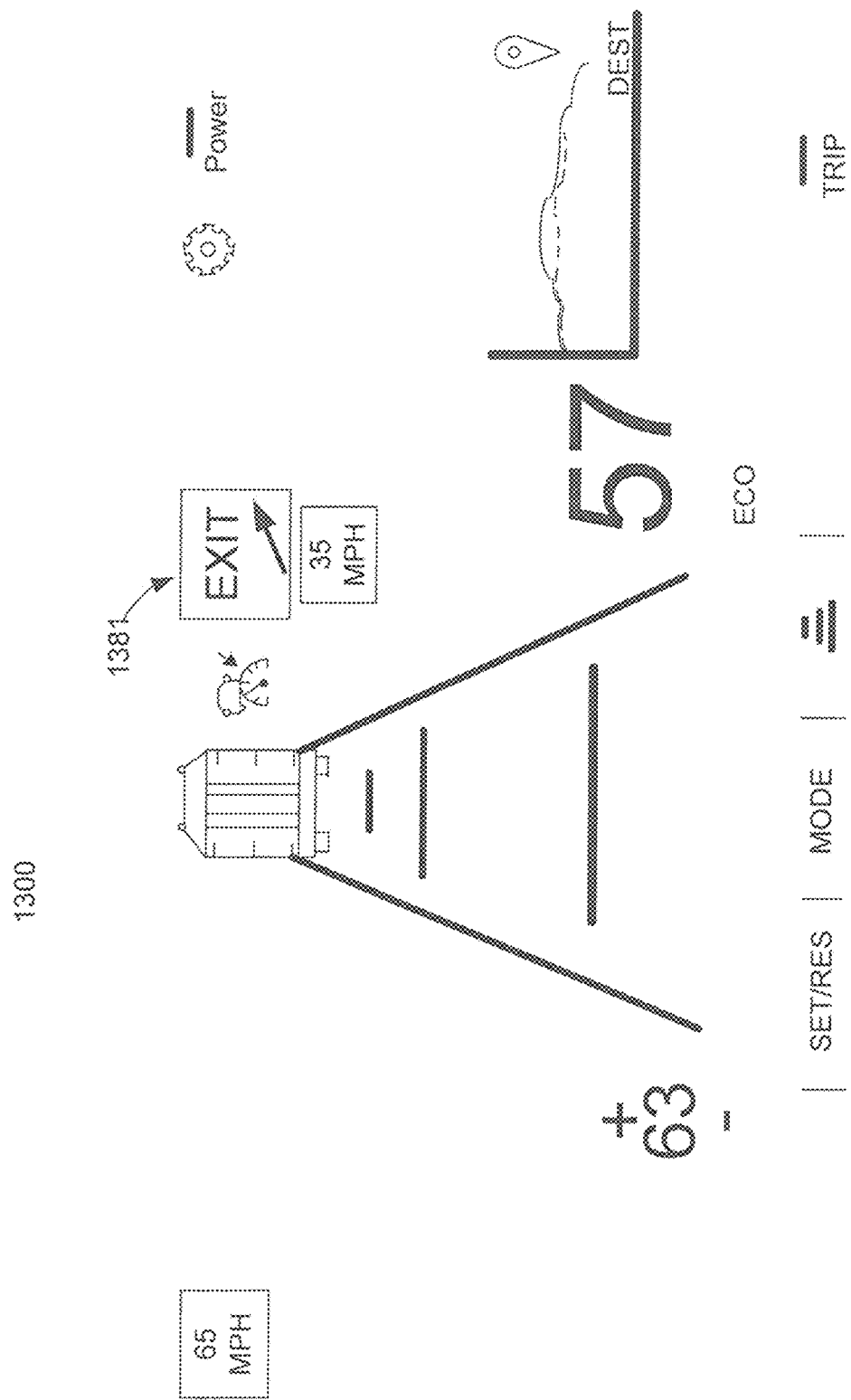
FIG. 13 is a block diagram of an exemplary user interface conveying anticipated change arranged in a different configuration in accordance with one embodiment.

FIG. 13 is a block diagram of an exemplary user interface conveying 1300 anticipated change arranged in a different configuration in accordance with one embodiment. In one embodiment, an indication 1381 of an upcoming exit is in a different configuration or location than indication 1281.

In one embodiment, a user interface include a light bar indicator. The light bar can be used to convey information regarding realization of a number of different performance objectives. The light bar can use changes in lighting (e.g., color, location on the light bar, etc.) to convey information to a user. The information can be associated with desired user changes to vehicle operation input. The driver input can be received via acceleration/deceleration pedals, steering component, gear shift mechanism, eye gaze/attention monitor, and so on. The light bar can include adaptive light that is in the peripheral view of a driver. The light bar can be used to convey passive mode information, coach mode information, and autonomous mode information. In one embodiment illuminating, a first portion of a light bar conveys user input to vehicle operation is within tolerable ranges (e.g., safety range, efficient operation ranges, etc.), illuminating a second portion of the light bar conveys user is providing excessive input to vehicle operation, and illuminating a third portion of the light bar conveys a user is not providing enough input to vehicle operation. In one embodiment illuminating the light bar with a first color conveys user input to vehicle operation is within tolerable ranges (e.g., safety range, efficient operation ranges, etc.), a second color conveys user is providing excessive input to vehicle operation, and a third color conveys a user is not providing enough input to vehicle operation. In one exemplary implementation, the first color is green, the second color is red, and the third color is blue.

Figure 14:
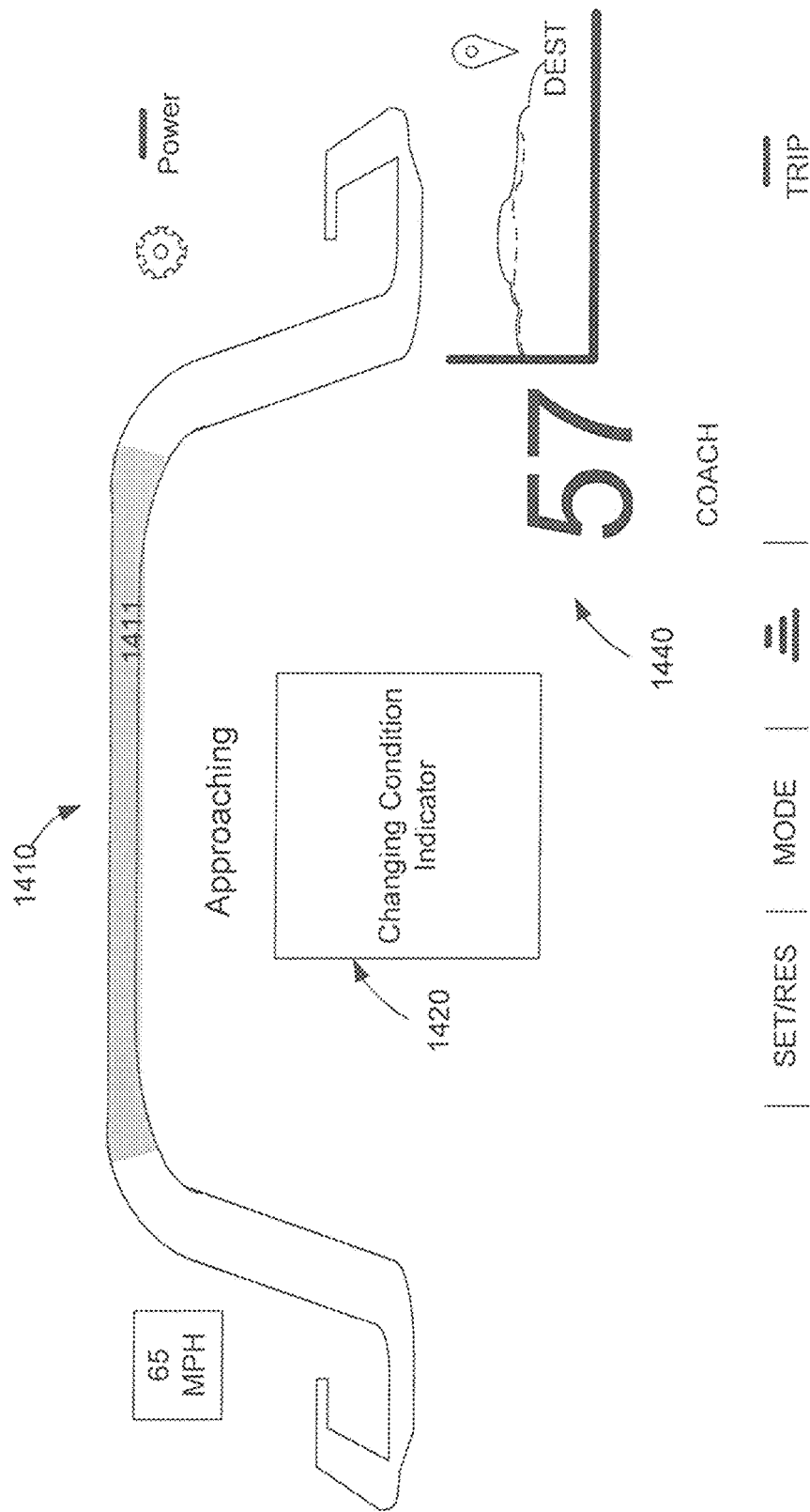
FIG. 14 is a block diagram of an exemplary user interface conveying vehicle operation acceptability with regards to a condition in accordance with one embodiment.

FIG. 14 is a block diagram of an exemplary user interface conveying vehicle operation acceptability with regards to a condition in accordance with one embodiment. In one embodiment the user interface includes an indicator 1410 conveying vehicle operation acceptability In exemplary embodiment, the user interface includes a light bar type icon or image. The top illuminated region 1411 of the indicator conveys vehicle operation is acceptable. In one embodiment, the top illuminated region 1411 is illuminated in a color that intuitively indicates vehicle operation acceptability. The color can be blue or some other color that intuitively indicates vehicle operation acceptability. The user interface can also include a changing condition indicator 1420. In one embodiment, the changing condition indicator can be associated with various changing conditions (e.g. changing road conditions, traffic conditions, weather conditions, etc.) The conveyance of information associated with indicator 1410 conveying vehicle operation acceptability and changing condition indicator 1420 can be coordinated. In one exemplary implementation, the indicator 1410 is conveying vehicle operation is acceptable for the approaching changing condition. Indicator 1440 can convey a desired speed.

Figure 15:
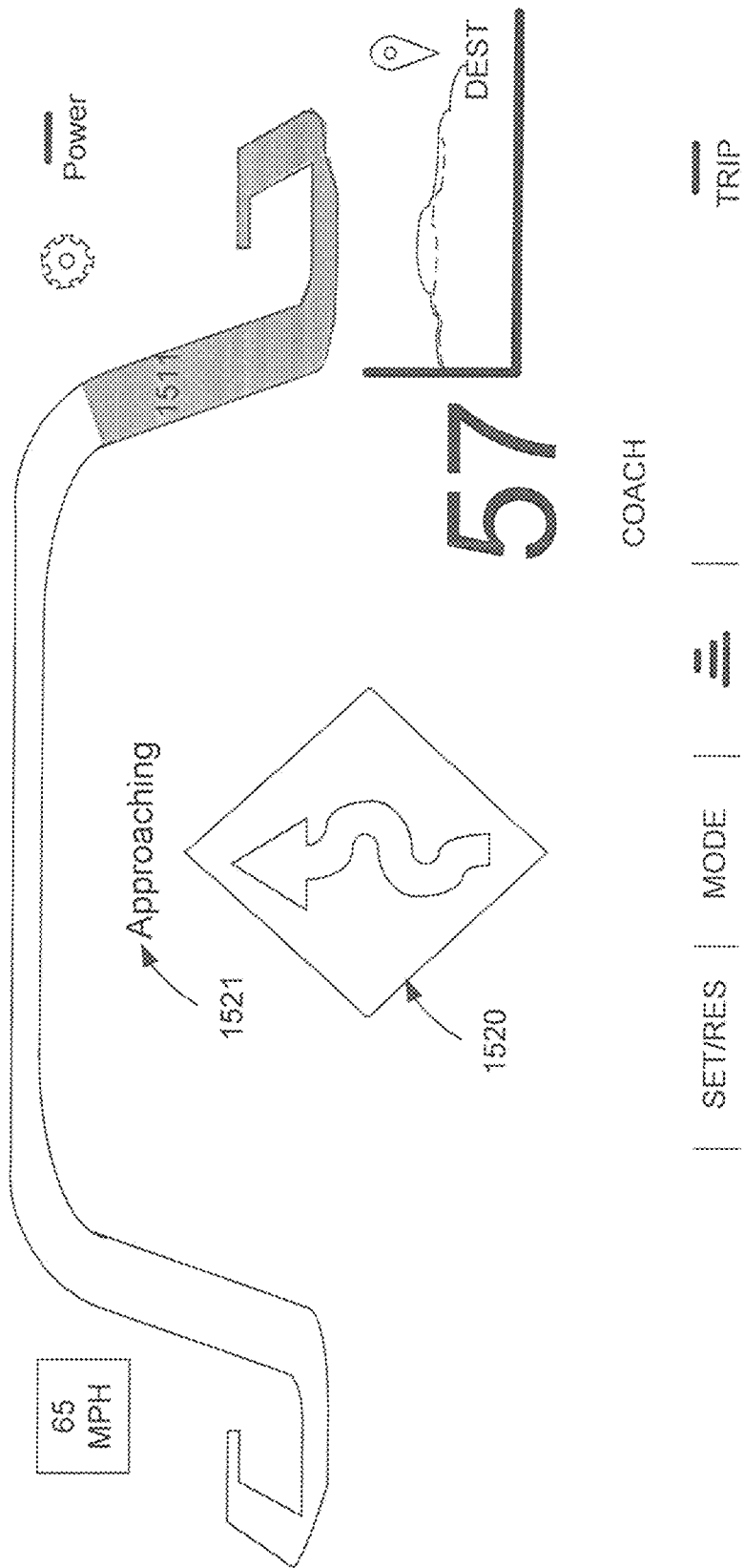
FIG. 15 is a block diagram of an exemplary user interface conveying vehicle operation unacceptability with regards to a condition in accordance with one embodiment.

FIG. 15 is a block diagram of an exemplary user interface conveying vehicle operation unacceptability with regards to a condition in accordance with one embodiment. The right side illuminated region 1511 of the indicator conveys a user is providing excessive input to vehicle operation. In one embodiment, the right side illuminated region 1511 of the indicator is illuminated in a color that intuitively indicates conveys a user is providing excessive input to vehicle operation. The color can be red or some other color that intuitively indicates vehicle operation acceptability. In one embodiment, a changing condition indicator can include both a changing condition indicator icon or image 1520 and a changing condition text indicator 1521. In one exemplary implementation, the right side illuminated region 1511 is conveying vehicle operation is unacceptable for the approaching changing road condition conveyed in changing condition indicator icon or image 1520. The changing road condition can be base upon observing the approaching horizon, sensor and detector information, archival map information, and so on.

Figure 16:
FIG. 16 is a block diagram of an exemplary user interface conveying corrective action in response to vehicle operation unacceptability in accordance with one embodiment.

FIG. 16 is a block diagram of an exemplary user interface conveying corrective action in response to vehicle operation unacceptability in accordance with one embodiment. A corrective action indicator 1610 can indicate a corrective action (e.g., apply brake, turn steering wheel, reverse, etc.) for the unacceptable condition. In one embodiment, audio output can be provided to the user. In one exemplary implementation, a left side illuminated region of the indicator can convey a user is not providing enough input to vehicle operation.

Figure 17:
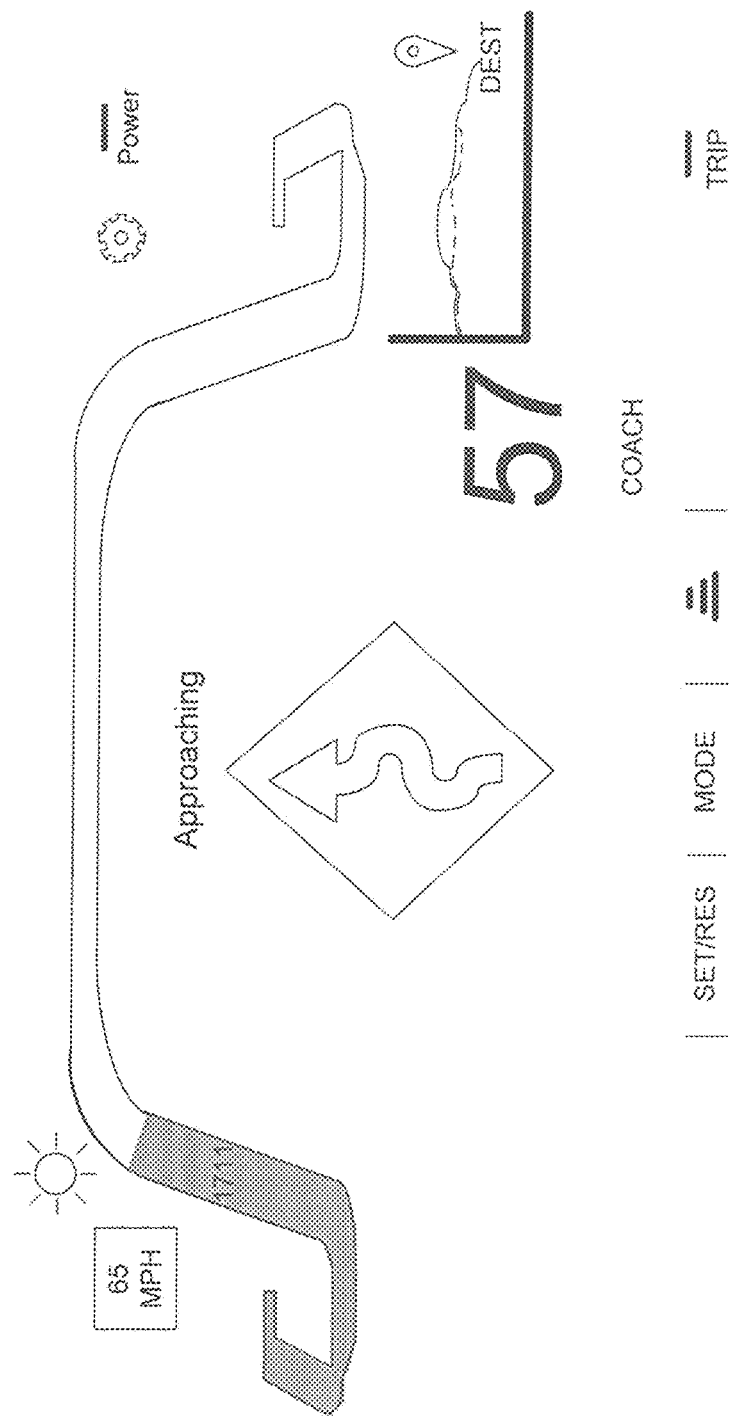
FIG. 17 is a block diagram of an exemplary user interface conveying corrective action is being implemented correctly in accordance with one embodiment.

FIG. 17 is a block diagram of an exemplary user interface conveying corrective action is being implemented correctly in accordance with one embodiment. The left side colored region 1711 of the indicator can convey vehicle operation is unacceptable. A left side illuminated region 1711 of the indicator can convey a user is not providing enough input to vehicle operation. In one embodiment the left side illuminated region 1711 can be blue.

Figure 18:
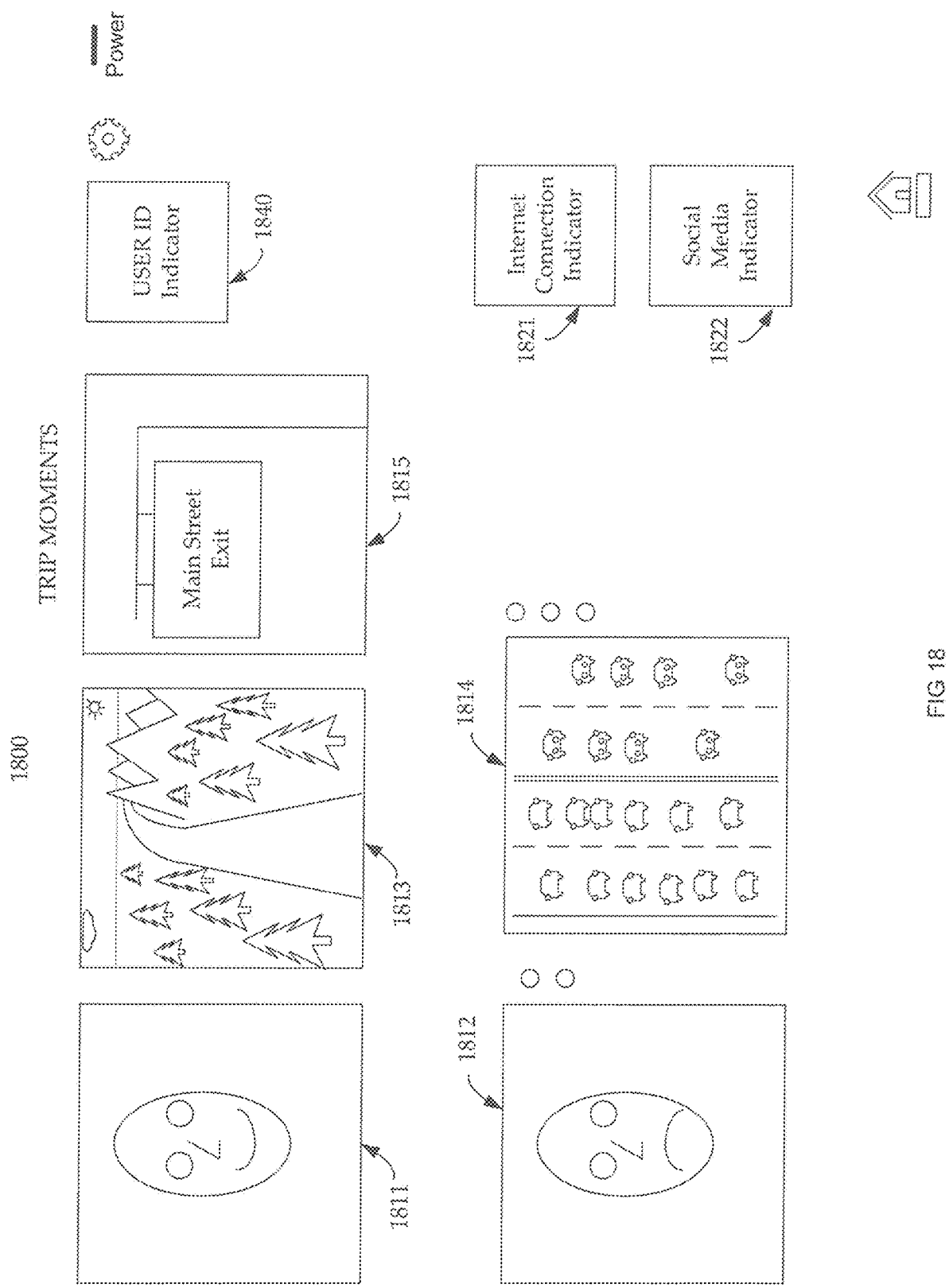
FIG. 18 is a block diagram of an exemplary user interface conveying trip image capture information in accordance with one embodiment.

FIG. 18 is a block diagram of an exemplary user interface 1800 conveying trip image capture information in accordance with one embodiment. In one embodiment, user interface 1800 includes captured photo indicators 1811, 1812, 1813, 1814, and 1815, internet connection indicator 1821, social media indicator 1822, and User ID indicator 1840.

Figure 19:
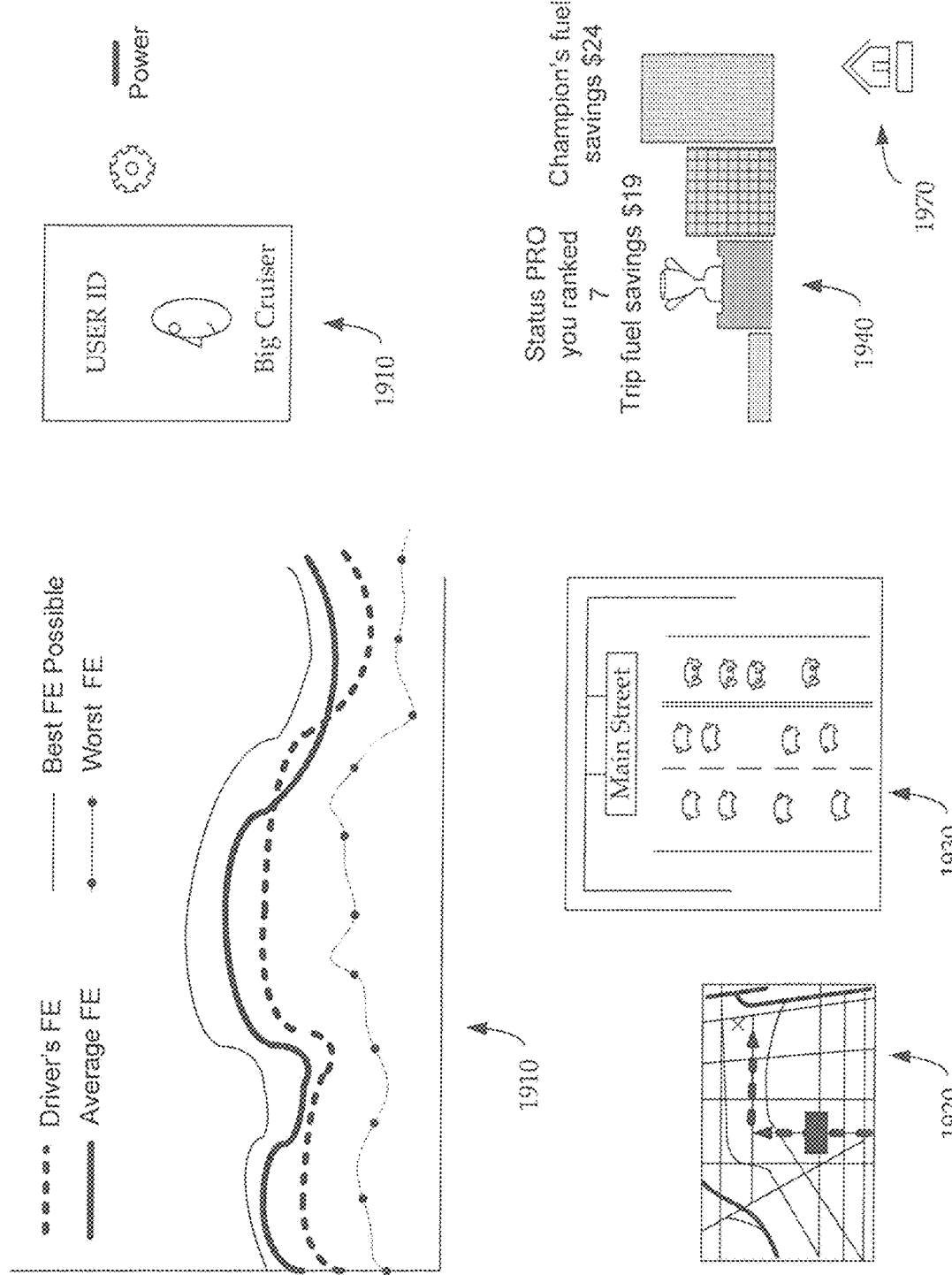
FIG. 19 is a block diagram of an exemplary user interface conveying trip summary information in accordance with one embodiment.

FIG. 19 is a block diagram of an exemplary user interface conveying trip summary in accordance with one embodiment. Performance indicator 9110 can convey amount of performance objective realization for the trip. Route indicator 1920 can convey the route taken during trip. In one embodiment, a similar route or map indicator can be conveyed during the trip indicting current location, future route, and proving direction instructions. Image indicator 1930 can convey images captured during trip. Incentive indicator 1940 can convey ranking and rewards corresponding to performance objective realization. User identification indicator 1910 can indicate a user's identification. Navigation icon 1970 can convey information regarding navigation of user interface features (e.g., other screens, portions, etc.).

Figure 20:
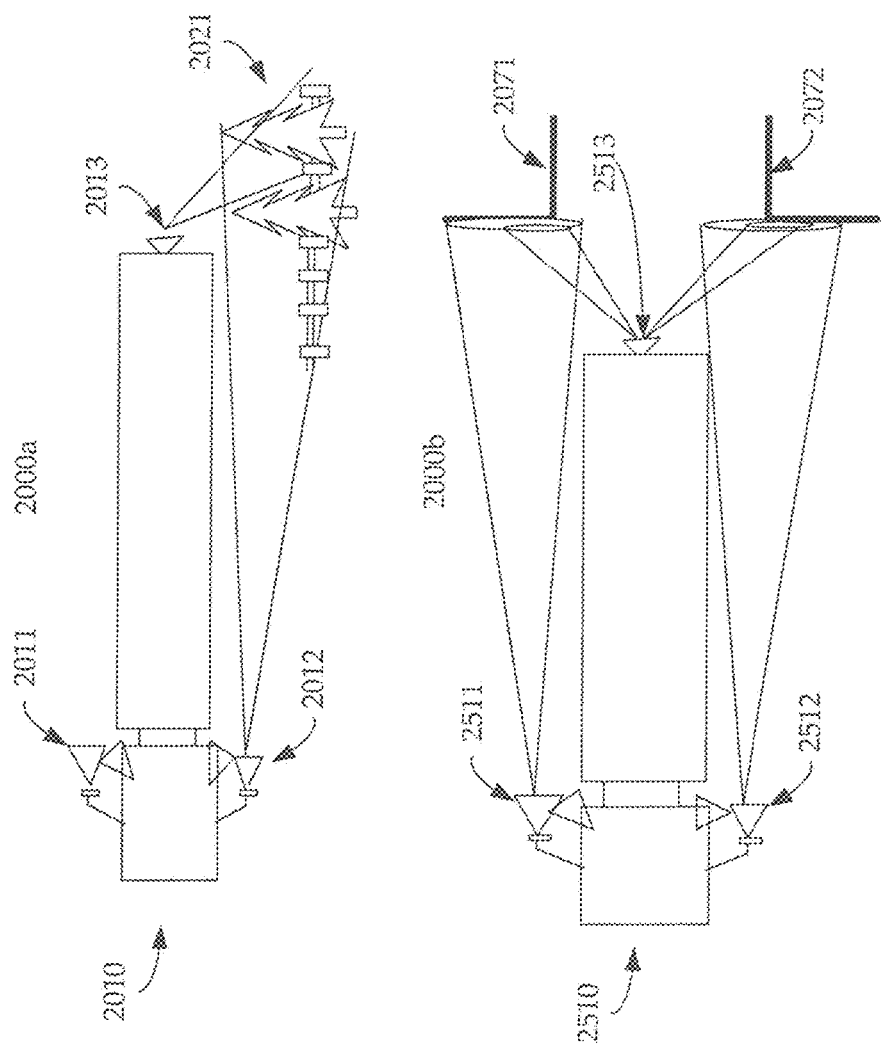
FIG. 20 is a block diagram of exemplary user interfaces conveying vehicle relation to other objects in accordance with one embodiment.

FIG. 20 is a block diagram of an exemplary user interfaces 2000a and 2000b conveying vehicle relation to other objects in accordance with one embodiment. User interface 2000a includes vehicle 2010 indictor with sensors icons 2011, 2012, and 2013, and object 2021. User interface 2000a illustrates the vehicle location relation to the object 2021. User interface 2000b includes vehicle 2510 indictor with sensors icons 2511, 2512, and 2513, and objects 2071 and 2072. User interface 2000b illustrates the vehicle location relation to the objects 2071 and 2072.

Figure 21:
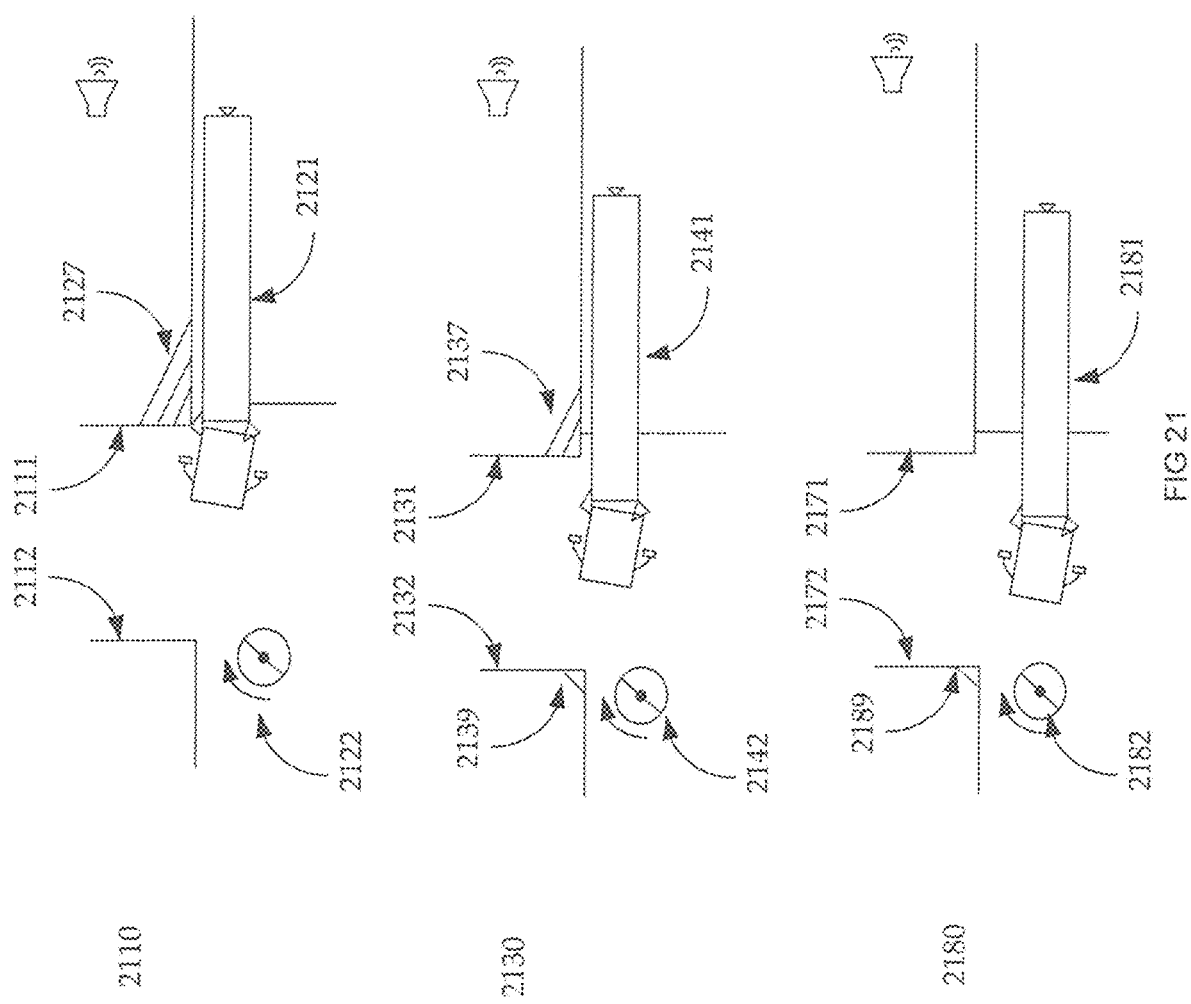
FIG. 21 is a block diagram of exemplary user interfaces conveying information associated with turning operations of a vehicle in accordance with one embodiment.

FIG. 21 is a block diagram of an exemplary user interfaces 2110, 2130 and 280 conveying information associated with turning operations of a vehicle in accordance with one embodiment. User interfaces 2110 includes vehicle indicator 2121, object 2111, object 2112, steering wheel rotation indicator 2122, and warning indicators 2127. Warning indicators 2127 indicates the turn is projected to be too sharp and the vehicle impact object 2111. User interface 2130 includes vehicle indicator 2141, object 2131, object 2132, steering wheel rotation indicator 2142, and warning indicators 2137 and 2139. Warning indicator 2137 indicates the turn is projected to be too sharp and the vehicle impact object 2131. Warning indicators 2139 indicates the turn is projected to be too long and the vehicle impact object 2132. User interface 2180 includes vehicle indicator 2181, object 2171, object 2172, steering wheel rotation indicator 2182, and warning indicator 2189. Warning indicators 2189 indicates the turn is projected to be too long and the vehicle impact object 2172.

Figure 22:
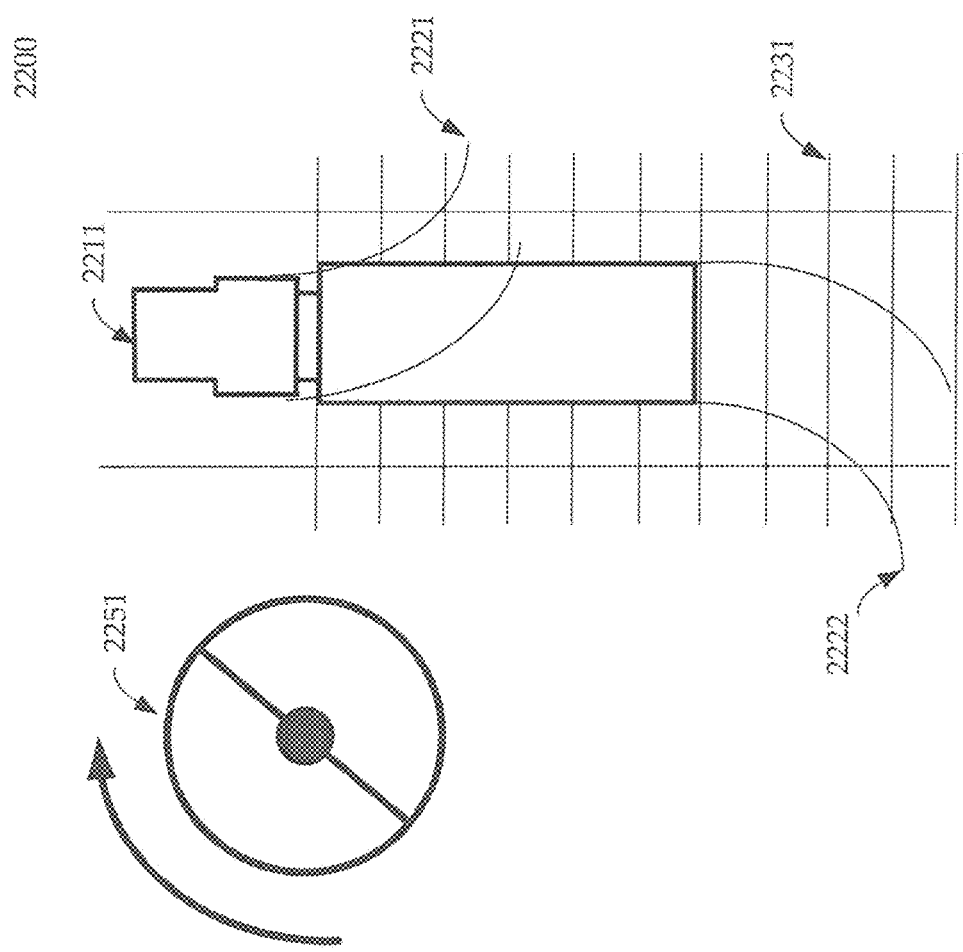
FIG. 22 is a block diagram of an exemplary user interface conveying information associated with a vehicle reversing operation in accordance with one embodiment.

FIG. 22 is a block diagram of an exemplary user interface 2200 conveying information associated with a reversing operation of the vehicle in accordance with one embodiment. User interfaces 2200 includes vehicle indicator 2211, steering wheel rotation indicator 2251, and path indicator 2221, path indicator 2222, and distance indicators 2231.

Figure 23:
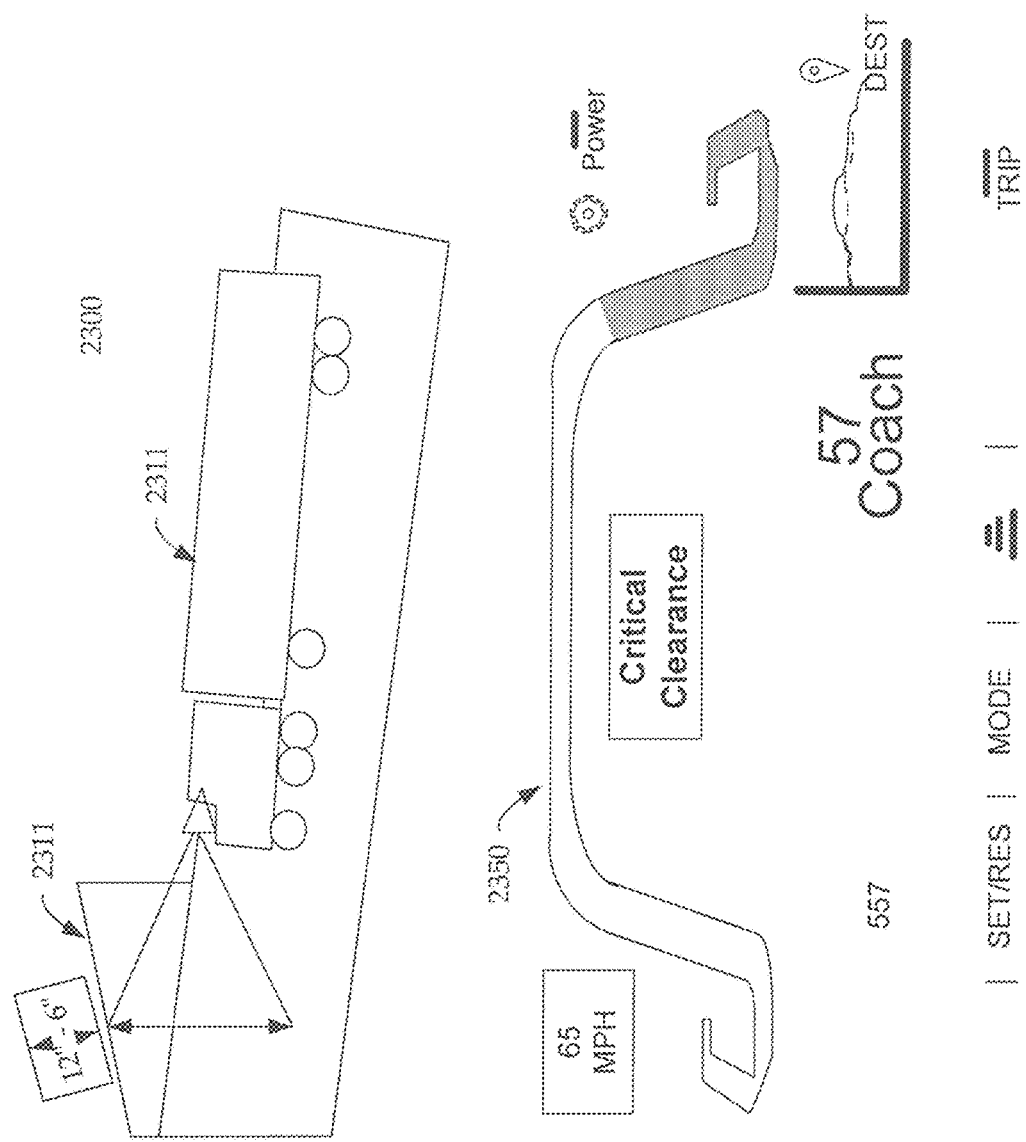
FIG. 23 is a block diagram of an exemplary user interface conveying information associated operating a vehicle under another object in accordance with one embodiment.

FIG. 23 is a block diagram of an exemplary user interface 2300 conveying information associated operating a vehicle under another object in accordance with one embodiment. User interface 2300 includes a vehicle indicator 2311, overhead object 2311, and light bar 2350.

FIG. 24 is a flow chart of exemplary user interface method 2400 in accordance with one embodiment. In one embodiment, of user interface method 2400 creating interface information and presenting interface information are based upon an operating mode of the vehicle, wherein the operating mode is selected from one of a passive mode, a coaching mode, an assist mode, and an autonomous mode.

In block 2410, input information associated with vehicle operation is received.

In block 2420, the input information is processed. In one embodiment, the processing can include evaluating performance of the vehicle operation.

In block 2430, output information is generated based upon evaluation of the ground vehicle operation. In one embodiment the output information includes information associated with performance of the ground vehicle operation.

In block 2440, interface information is created. The interface information can be configured to convey results of the evaluation.

In block 2450, interface information is presented, including presenting information indicating metrics corresponding to performance of the ground vehicle operation. In one exemplary implementation, interface information includes guidance on implementation (e.g., current, future, etc.) of an operational characteristic of the ground vehicle with respect to realizing a performance objective.

It is appreciated an analysis component can be implemented in various configurations. An analysis component can similar to of configured in an analysis system, a processing system, a predictive enhanced cruise controller, an energy consumption cruise controller, and so on.

FIG. 25 is a flow chart of exemplary analysis system 2500 in accordance with one embodiment. In one embodiment analysis system is similar to analysis system 120. Analysis system 2500 includes processing component 2510 and memory 2520. In one embodiment processing component 2510 processes information associated with vehicle operation and realization of performance objectives. Processing component 2510 includes vehicle operation analysis component 2511 configured to analyze information associated with vehicle operation and realization of performance objectives. Processing component 2510 includes user interface input/output (I/O) component 2511 configured to input and output information from and to user interface 2530. Processing component 2510 can also receive and forward information from and to other vehicle components 2580. Memory component 2520 can store information associated with vehicle operation and realization of performance objectives. Memory component includes a storage capacity to store analysis instructions and vehicle operation data associated with processing information by processing component 2510.

Efficiently and effectively conveying the information between a user and a vehicle via a user interface enables characteristics leveraging of both a user (e.g., instinct, sensory input, cognitive abilities, human oversight etc.) and a vehicle (e.g., enhanced detection mechanisms, large information availability and storage, significant processing capability, accuracy, avoiding human frailties, repeatability, etc.). The interactions and characteristics leveraging of the user and the vehicle via the user interface enables improved vehicle operation and performance, It is appreciated that types of vehicle can vary (car, plane, boat, etc,) and operating environments (e.g., ground, air, water, space, etc.) can have different challenges (e.g., associated with different conditions, characteristics, etc.) that can have a significant impact on a user/machine interface. Ground vehicle operations are typically very different than other types of vehicle operation (e.g., water, air, etc.) and involve unique and perilous conditions and challenges. For example, ground vehicle operations often involve objects (e.g., other vehicles, pedestrians, buildings, trees, etc.) in closer proximity to the vehicle (e.g., require quicker reactions, less forgiving with a guidance action (hit something fast), less time to correct a mistake, pedestrians, etc.). In addition there are often significant operational differences between types of ground vehicles (e.g., cars, commercial trucks, etc.). These constraints can mean the user interface is critical to proper vehicle operation and efficient and effective user interfaces can enable improved vehicle operations and performance. Furthermore, while there may be relatively consistent high level of user abilities for other types of (e.g., airplane pilots usually have advanced training and experience, ship captains typically have many years of training and experience, etc.), it is not necessarily the same for ground vehicle users. There is often significant differences in ground vehicle user abilities and corresponding vehicle operation. Efficient and effective user interfaces enable convenient and accurate interactions between the user and the vehicle which in turn enable improved vehicle operation and performance.

It is appreciated that components, functions, method steps, and the like described herein can be implemented in various configurations. Performance considerations can include one or more performance objectives. Vehicle operation considerations can include one or more vehicle operations. Vehicle component considerations can include one or more vehicle components. User interaction considerations can include one or more user interactions. User interface considerations can include one or more indicators.

Some portions of the detailed descriptions are presented in terms of procedures, logic blocks, processing, and other symbolic representations of operations on data bits within a computer memory. These descriptions and representations are the means generally used by those skilled in data processing arts to effectively convey the substance of their work to others skilled in the art. A procedure, logic block, process, etc., is here, and generally, conceived to be a self-consistent sequence of steps or instructions leading to a desired result. The steps include physical manipulations of physical quantities. Usually, though not necessarily, these quantities take the form of electrical, magnetic, optical, or quantum signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are associated with the appropriate physical quantities and are merely convenient labels applied to these quantities. Unless specifically stated otherwise as apparent from the following discussions, it is appreciated that throughout the present application, discussions utilizing terms such as "processing", "computing", "calculating", "determining", "displaying" or the like, refer to the action and processes of a computer system, or similar processing device (e.g., an electrical, optical or quantum computing device) that manipulates and transforms data represented as physical (e.g., electronic) quantities. The terms refer to actions and processes of the processing devices that manipulate or transform physical quantities within a computer system's component (e.g., registers, memories, other such information storage, transmission or display devices, etc.) into other data similarly represented as physical quantities within other components.

The foregoing descriptions of some specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as suited to the particular use contemplated. It is intended that the scope of the invention be defined by the Claims appended hereto and their equivalents. The listing of steps within method claims do not imply any particular order to performing the steps, unless explicitly stated in the claim.

What is claimed:

1. A system comprising:
   a user interface configured to convey information associated with operation of a ground vehicle to and from a user, wherein the information associated with the operation of the ground vehicle includes information associated with a performance objective, wherein the user interface is configured to select a mode of operation;
   a processor configured to process information associated with the operation of the ground vehicle, including performing a comparative analysis of actual performance of the ground vehicle operation to target values associated with the ground vehicle operation, wherein the processor communicates with the user interface; and
   a memory configured to store information associated with the operation of the ground vehicle, including information associated with the user interface.

2. The system of claim 1, wherein information associated with the operation of the ground vehicle includes metric information that expresses a characteristic corresponding to the performance objective.

3. The system of claim 1, wherein information associated with the performance objective includes metric information associated with current operation of the ground vehicle.

4. The system of claim 1, wherein information associated with the performance objective includes metric information associated with future operation of the ground vehicle.

5. The system of claim 1, wherein comparative analysis of actual performance of the ground vehicle operation to target values associated with the ground vehicle operation.

6. The system of claim 1, wherein the performance objective is based upon operation of a vehicle similar to the ground vehicle by another user.

7. The system of claim 1, wherein the performance objective is based upon historical operation of the vehicle.

8. The system of claim 1, wherein the performance objective is associated with a cost of operating the ground vehicle.

9. The system of claim 1, wherein the user interface includes a performance indicator, wherein the performance indicator is configured to convey information associated with the various aspects of vehicle operation.

10. A method comprising:
    receiving input information associated with ground vehicle operation;
    processing the input information, including evaluating performance of the ground vehicle operation;
    generating output information based upon evaluation of the ground vehicle operation, including output information associated with performance of the ground vehicle operation;
    creating interface information configured to convey results of the evaluation;
    selecting a mode of operation via a user interface; and
    presenting the interface information via the user interface, including presenting information indicating metrics corresponding to performance of the ground vehicle operation.

11. The method of claim 10, wherein the interface information includes guidance on implementation of an operational characteristic of the ground vehicle with respect to realizing a performance objective.

12. The method of claim 10, wherein the interface information includes guidance on current implementation of the ground vehicle operation.

13. The method of claim 10, wherein the output information includes guidance on future implementation of ground vehicle operation.

14. The method of claim 11, wherein the creating interface information and presenting interface information are based upon the operating mode of the vehicle, wherein the operating mode is selected from one of a passive mode, a coaching mode, an assist mode, and an autonomous mode.

15. A system comprising:
    an analysis component configured to analyze input information associated ground vehicle operation, including analysis associated with a performance target, wherein the analysis component generates output information based upon results of analyzing the input information; and
    a user interface component configured to convey the output information to a user, including information associated with the performance target, wherein the user interface component is configured to select a mode of operation.

16. The system of claim 15, wherein the user interface component is also configured to detect input information associated with the ground vehicle operation and forward the input information to the analysis component.

17. The system of claim 15, wherein features of the user interface are dependent upon selection of the driving mode, wherein the driving mode is selected from one of a passive mode, a coaching mode, an assist mode, and an autonomous mode.

18. The system of claim 15, wherein the interface component is also configured to forward input information to other vehicle control components.

19. The system of claim 15, wherein the interface includes a target indicator, wherein the target indicator is associated with an objective regarding vehicle operation.

20. The system of claim 15, wherein the interface includes an actual operation condition indicator.

* * * * *